United States Patent [19]

Espelage et al.

[11] Patent Number: 4,587,474

[45] Date of Patent: May 6, 1986

[54] CONTROL FOR BUMPLESS TRANSFER OF AN AC MOTOR BETWEEN A SOLID-STATE INVERTER AND A SUPPLY MAINS

[75] Inventors: Paul M. Espelage, Salem, Va.; David L. Lippitt, Scotia, N.Y.; James M. Nowak, Roanoke, Va.

[73] Assignee: General Electric Company, Salem, Va.

[21] Appl. No.: 626,712

[22] Filed: Jul. 2, 1984

[51] Int. Cl.[4] ........................... H02P 1/28; H02P 1/30

[52] U.S. Cl. .................................... 318/709; 318/705; 318/723; 318/778

[58] Field of Search ............... 318/705, 713, 715, 709, 318/722, 723, 778; 307/87; 363/72

[56] References Cited

U.S. PATENT DOCUMENTS

| | | | |
|---|---|---|---|
| 3,794,846 | 2/1974 | Schlicher et al. | 307/87 |
| 4,399,395 | 8/1983 | Espelage | 318/803 |
| 4,409,533 | 10/1983 | Kawabata | 318/778 |
| 4,417,193 | 11/1983 | Hirata | 318/803 |
| 4,427,934 | 1/1984 | Tupper | 318/723 |
| 4,443,747 | 4/1984 | Chausse et al. | 318/723 |
| 4,449,087 | 5/1984 | Lippitt et al. | 318/723 |
| 4,451,112 | 5/1984 | Hattori et al. | 318/778 |

*Primary Examiner*—David Smith, Jr.

*Attorney, Agent, or Firm*—Arnold E. Renner

[57] ABSTRACT

A power conditioner having a source and load converter each using a phase-locked loop to control their respective converter firings achieves synchronization with a supply mains by determining the phase error between supply mains and motor voltages by obtaining the instantaneous difference between the output signals of the source and load phase locked loops. This phase error is passed through a simple gain and summed with a speed regulator setpoint, which now becomes an inverter frequency regulator with the nominal setpoint being the supply mains frequency. The voltage amplitude error between the supply mains and the motor is obtained by comparing the absolute value of the source voltage with the properly scaled absolute value of the integrated motor voltage and this error signal is input to the flux regulator in a synchronous or induction motor controller in place of the normal input when not synchronizing.

3 Claims, 21 Drawing Figures

CONTROL FOR BUMPLESS TRANSFER OF AN AC MOTOR BETWEEN A SOLID-STATE INVERTER AND A SUPPLY MAINS

REFERENCED MATERIAL

Reference is made to an appendix which sets forth a computer program listing of the software modules which have been modified in the program listing provided in the microfiche appendix of D. Lippitt et al U.S. Pat. No. 4,449,087 and the microfiche appendices of copending applications. Ser. No. 626,982 filed 7-2-84 now U.S. Pat. No. 4,565,953 and Ser. No. 626,999 filed 7-2-84 now U.S. Pat. No. 4,562,396. Included with this application is 12 sheets of computer program listing. U.S. Pat. No. 4,449,087 and applications Ser. Nos. 626,982 and 626,999 are assigned to the same assignee as the instant application and are all hereby incorporated by reference.

CROSS REFERENCE TO RELATED APPLICATIONS

This application is related to copending applications Ser. No. 626,999, Ser. No. 626,982 and Ser. No. 627,000 filed 7-2-84 now U.S. Pat. No. 4,539,514, all assigned to the instant assignee.

BACKGROUND OF THE INVENTION

The present invention relates to a control for transferring an AC motor receiving power directly from a supply mains to receiving power from a solid-state inverter and for transferring an AC motor receiving power from a solid-state inverter to receiving power directly from a supply mains.

In some applications, such as gas turbine static starters, the purpose of a variable-speed solid-state power converter is to replace a diesel engine, which brings a turbine/generator up to a self-sustaining speed at which the turbine can then be fired and brought up to a speed at which the generator can be synchronized to and subsequently transferred to the power grid. The advantage of a solid-state power converter approach is that a single converter can be used to start one turbine, then be switched to start others.

In other applications, such as for variable speed fan and pump drives for example, it may be desirable to achieve variable speed operation with a power converter but transfer the motor to the supply mains for sustained operation at high speed. Often these drives are in such critical applications that in the event of a power converter outage, a backup system is designed to transfer the motor to the supply mains and control the process by some mechanical throttling means. In this case, since the power converter has failed, the transfer cannot be made bumpless, the power converter is switched out and the motor transferred to the line.

A bumpless transfer is defined as a transfer that does not cause an undesirable current transient in the motor, inverter, or supply mains. The normal, non-faulted power converter transfer is made bumpless by equalizing the motor voltage and phase to the supply mains and then in a make before break manner transfer the motor to the supply mains. The other half of the problem is to be able to transfer the motor back from the supply mains to the power converter, again, in a bumpless manner.

It is an object of the present invention to provide a control for transferring in a bumpless manner a motor from a power conditioner to a supply mains or from a supply mains to a power conditioner in a motor drive having a source converter and a load converter each using a phase-locked loop to control converter firings without requiring additional hardware.

SUMMARY OF THE INVENTION

In one aspect of the present invention a method of synchronizing an AC motor supplied from a power conditioner to a supply mains is provided where the source converter and load converter of the power conditioner each use a phase-locked loop to control their respective converter firings. The method comprises the steps of synchronizing the phase-locked loop of the source converter to the integrated supply mains voltage and synchronizing the phase-locked loop of the load converter to the motor flux. Next, the phase error between the outputs of the phase-locked loops is determined and amplified. The amplified phase error and a speed regulator setpoint are summed together, with the speed regulator setpoint being the supply mains frequency, so that the speed regulator becomes an inverter frequency regulator. The source voltage is compared with the appropriately scaled integrated motor voltage and the difference is supplied to a flux regulator which varies the flux to reduce the difference. The AC motor is then transferred to the supply mains.

In another aspect of the present invention a method of synchronizing an AC motor supplied from a supply mains to a power conditioner is provided. The source and load converters of the power conditioner each use a phase-locked loop to control their respective converter firings. The method comprises the steps of coupling the power conditioner to the supply mains while the motor is still coupled to the supply mains, but not firing the controllable switches in the power conditioner converters. The speed regulator is disabled. The source phase-locked loop is synchronized to the integrated mains supply voltage and the load phase-locked loop is synchronized to the motor flux. Next, the motor current is measured and used to generate a torque command for the source and the load converters. The load and source side controllable switches are fired responsive to the torque command. The current provided by the source converter is ramped up, responsive to the torque command, to the same value being supplied to the motor. The current supplied by the power conditioner is compared to the current in the motor. When the current supplied by the power conditioner and the current in the motor are the same, the supply mains are disconnected from the motor. The power conditioner speed regulator and flux regulator are activated at the same time the supply mains are disconnected. The speed regulator output is initialized to the value of current presently being supplied and the flux regulator setpoint is ramped down to a value commanded by the torque versus flux profile.

BRIEF DESCRIPTION OF THE DRAWING

The features of the invention believed to be novel are set forth with prticularity in the appended claims. The invention itself, both as to organization and method of operation, together with further objects and advantages thereof, may best be understood by reference to the following description taken in conjunction with the accompanying drawing in which:

DETAILED DESCRIPTION OF THE INVENTION

Figures 1, 1B:
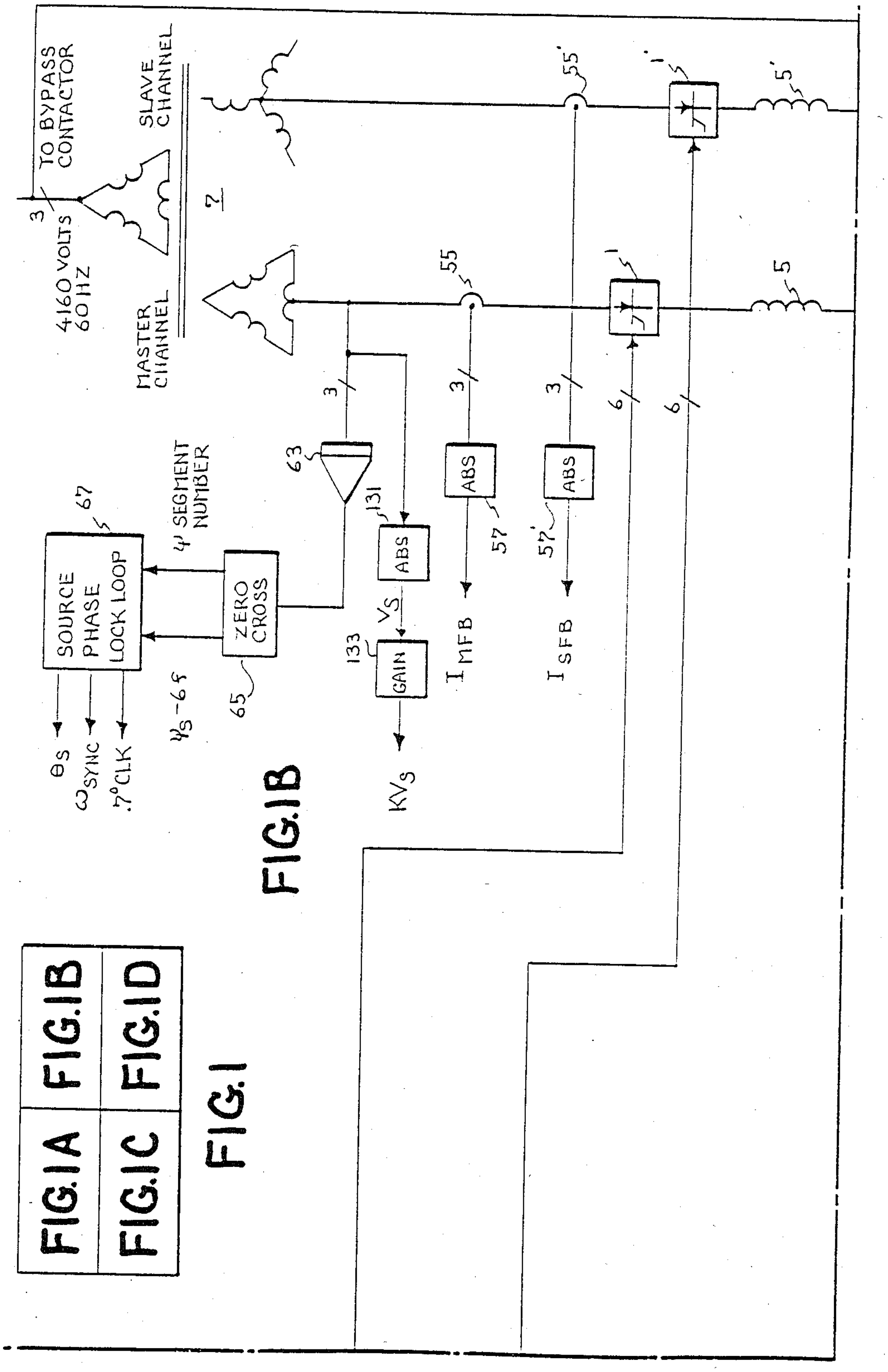
FIGS. 1A–D constitute a major block diagram representation of a 12 pulse parallel converter drive system incorporating the present invention.
Figure 1A:
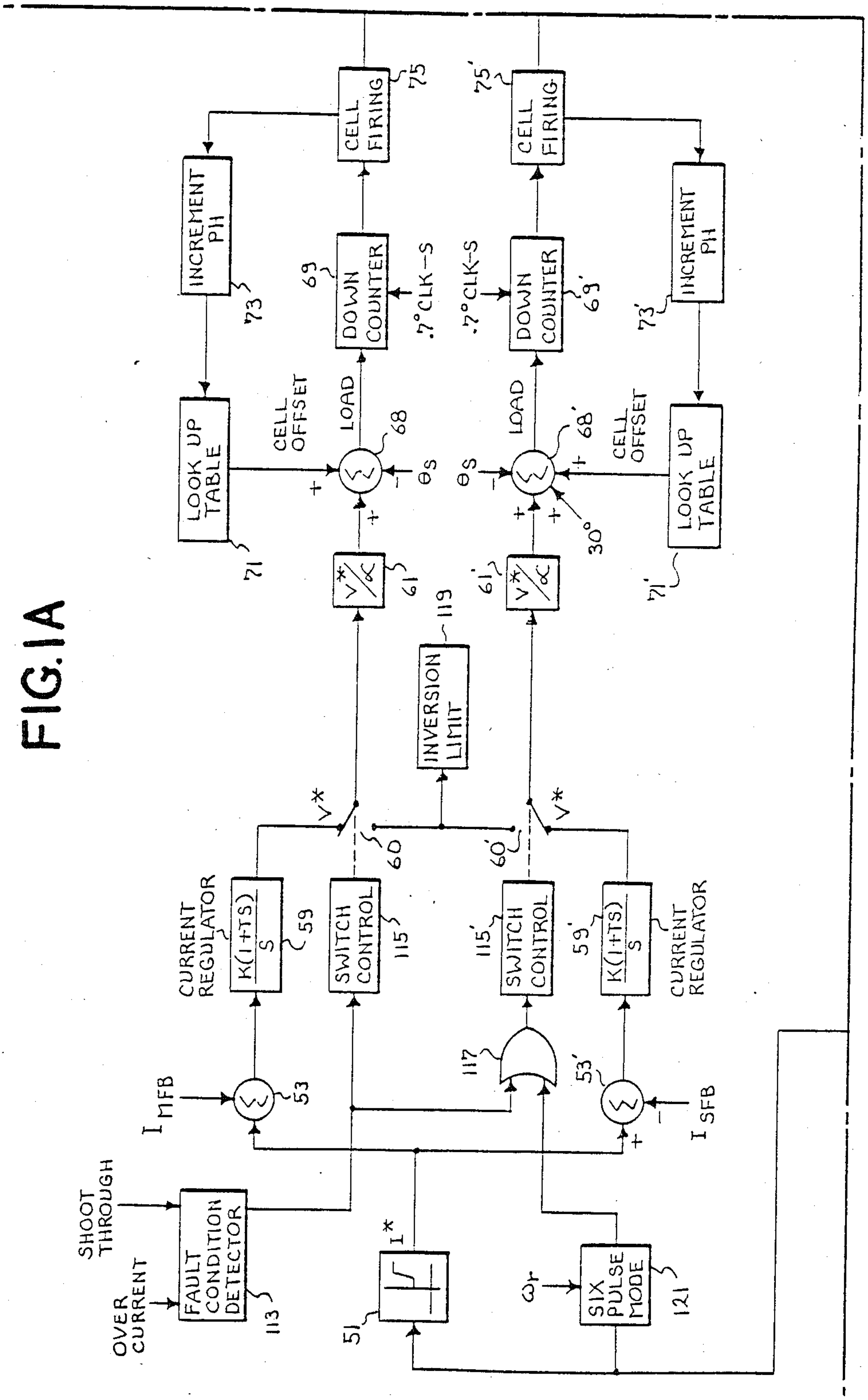
Figure 1C:
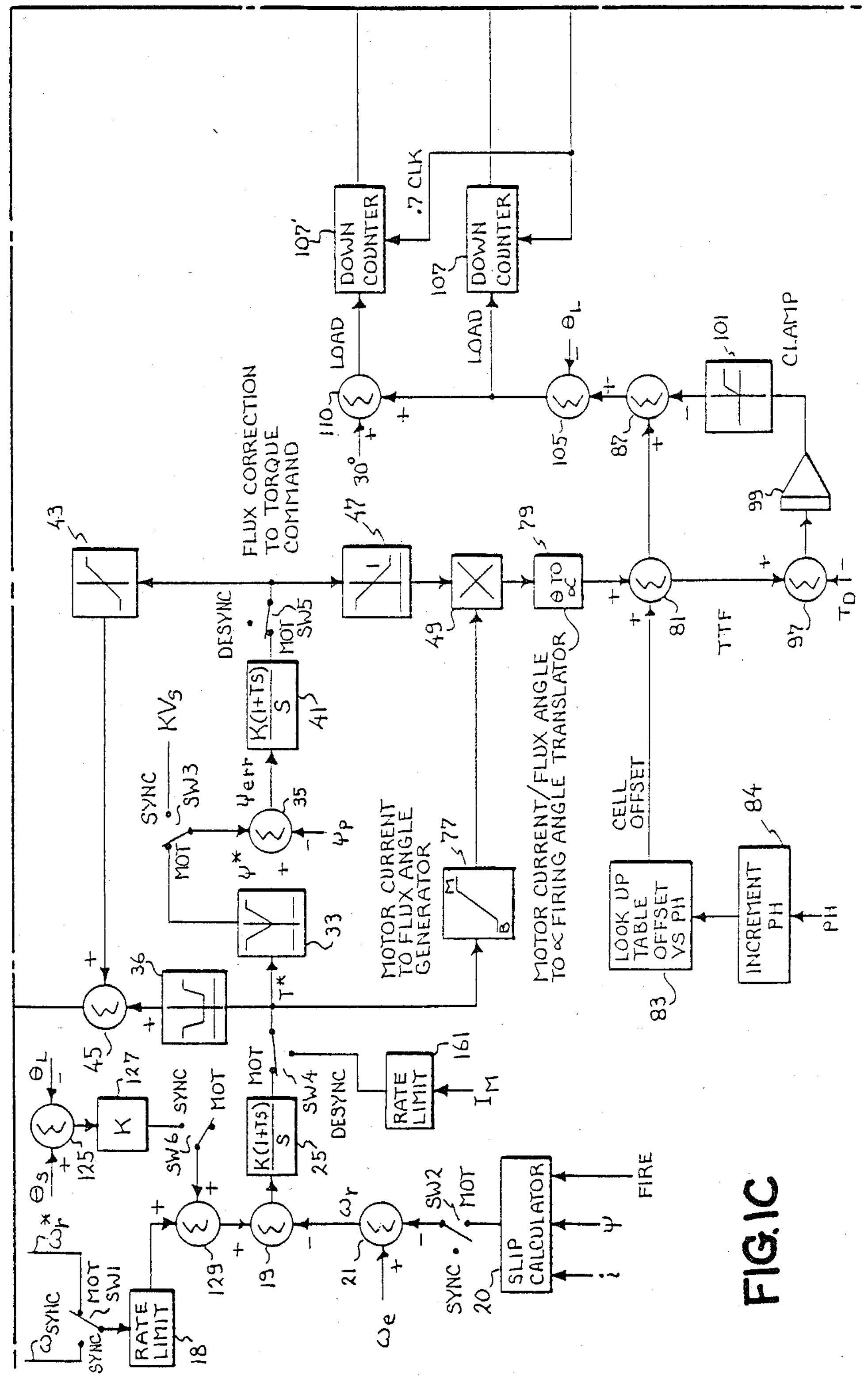

Referring now to the drawing and particularly FIGS. 1A–D thereof, an induction motor drive system including two prallel converters is shown. The first parallel converter comprises a source side converter which in the present embodiment is a phase controlled rectifier 1 and a load side converter which in the present embodiment is current controlled autosequentially commutated inverter 2. During motoring operation the phase controlled rectifier provides variable magnitude direct current to the inverter 2 through a DC-link reactor 5. The first parallel converter is also referred to in the present application as the master channel. The second parallel converter referred to as the slave channel comprises the same type of elements as the master channel, a phase controlled rectifier 1′ and an autosequentially commutated inverter 2′ coupled together by a DC-link reactor 5′. A three phase transformer 7 includes a delta connected primary, a delta connected secondary and a wye connected secondary coupled to, respectively, an external three phase power source, the master channel and the slave channel. The inverters 2 and 2′ operate to provide 12 pulse 6 phase power to an induction motor 9 through a three phase transformer 11 having wye and delta connected primaries and a delta connected secondary. The wye connected primary is coupled to the output of the master channel inverter 2 and the delta connected primary is coupled to the slave channel inverter 2′.

A commanded speed $\omega_r^*$ is an input signal to the AC motor drive control and is supplied through a switch SW1 to a rate limiting block 18 and the output of the rate limiting block is compared to a speed reference signal $\omega_r$ in summer 19. The speed reference signal $\omega_r$ is developed by calculating the slip in a slip calculator 20 from motor current, flux and firing angle from the master channel, and subtracting the slip which is coupled to summing junction 21 through a switch SW2 from the frequency $\omega_e$ of the power supplied to the induction machine 9 which is also coupled to summing junction 21. The error signal from summing junction 19 is supplied to a speed regulator circuit 25 having a transfer function of k (1+T s)/s where s is the LaPlace operator. The output of the speed regulator block is a torque command T*. The torque command is fed through a switch SW4 to three control paths.

An upper path controls the current in the two phase controlled rectifiers 1, 1′. A center control path controls flux in the induction motor 9 by controlling the firing of the switching devices in inverters 2,2′. The center path provides flux correction to the torque command T* provided to the upper and lower paths. Function block 33 converts the torque reference signal T* to a reflux command $\psi^*$. The function implemented in function block 33 provides an offset to assure a fixed level of flux at zero torque. The flux command is coupled through a switch SW3 to a summing junction 35 where it is compared to a flux signal $\psi_p$, determined by integrating the output voltage of inverter 2 in integrator 37 and passing the signal through a peak detector 38, to form a flux error signal. The output of summing junction 35 is fed through a gain block 41 through a switch SW5 to a limiter 43. The output of the limiter is supplied to a summing junction 45 along with the magnitude of the torque command T*, the output from function block 36. The output of limiter 43 adjusts the current command, when the flux is different from the commanded value, to convert the upper current control path to a flux regulator when torque and commanded torque are both near zero.

The flux error signal from gain block 41 is also supplied to an offset function in block 47. The output signal block 47 is coupled to a multiplier 49 in the lower control path. Offset function 47 generates an output of unity when the flux error signal is zero. The output of the offset function 47 decreases below unity when the commanded flux is greater than the actual flux to decrease the angle between motor current and flux to divert more of the available current into the flux producing axis.

The flux corrected current signal from summing junction 45 is supplied to a function block 51 which provides a current command I* which is compared to a current feedback signal $i_{MFB}$ in summing junction 53. The current feedback signal is obtained from current sensors 55 in each of the three lines supplying the phase controlled rectifier 1 in the master channel. Absolute value block 57 receives the three sensed line currents and provides the current feedback signal $I_{MFB}$ indicative of the magnitude of the three signals.

Current regulator 59, which can be a proportional plus integral regulator, in response to the current error from summing junction 55, provides a voltage command signal V*. A voltage to firing angle translator 61, which can be implemented as a look-up table, provides a firing angle command $\alpha^*$ in response to the voltage command V* received through a switch 60.

The firing circuit, including the phase-locked loop integrator, zero crossing detector, cell firing block and down counter for the phase controlled thyristor bridge is the same as set-forth in Lippitt et al U.S. Pat. No. 4,449,087. The three phase line to line voltages supplied to the phase controlled thyristor bridge are integrated in integrator 63 and the zero crossings of the integrated voltages are determined in block 65 and used to form a synchronizing pulse train to the phase-locked loop 67 having a frequency of 6 times the line frequency. A preferred form of apparatus utilizable for implementing the integration of the line to line voltages comprises circuitry shown and described in U.S. Pat. No. 4,399,395 issued Aug. 6, 1983, entitled "Line to Line Voltage Reconstruction for Synchronizing Thyristor Power Converter". U.S. Pat. No. 4,399,395 is hereby incorporated by reference. Such circuitry operates to reconstruct the line to line voltage waveforms which become corrupted by the commutation notches appearing in the waveforms of the phase voltages during the time each phase current transfers from an outgoing phase to an oncoming phase by the appropriate firing of the individual thyristors. The line to line voltage reconstruction preferred by the subject invention consists of a composite waveform developed by summing at least one integrated line to line voltage containing commutation notches with a signal corresponding to at least one "delta" current which is derived from the difference of two phase currents and multiplied by a factor representative of the commutation inductance.

At the occurrence of a zero crossing signal, a time counter in the phase-locked loop 67 is read. The correct time counter reading at this instant is known, and the difference between the actual and correct values represents a phase error which passes through a software proportional plus integral regulator. The output of the regulator represents the value by which the high frequency clock to the phase-locked loop counter is divided so as to provide a clock frequency from the phase-locked loop counter of 512 times the fundamental frequency of the line to line voltage supplied the phase controlled thyristor bridge 1. The frequency of 512 times the fundamental frequency provides an angle resolution of 0.703° of fundamental frequency and serves as the clock frequency to the down counter 69. The commanded firing angle $\alpha^*$ is added to a cell offset from a look-up table 71. The table look-up provides one of six offsets based on the variable PH which is indicative of the next cell pair to be fired. The variable PH is incremented each time a cell is fired.

The term cell is used in this application to refer to the controllable switches in the converters, namely, thyristors. The variable PH which can take on the values of one through six inclusive is indicative of which cell pair which is to be fired next as, shown in the table below.

| PH | ON CELLS |
|---|---|
| 1 | 6 and 1 |
| 2 | 1 and 2 |
| 3 | 2 and 3 |
| 4 | 3 and 4 |
| 5 | 4 and 5 |
| 6 | 5 and 6 |

The cells in the bridge of the converters 1 and 3 are numbered, as shown below, in the order in which they are fired

| | | |
|---|---|---|
| 1 | 3 | 5 |
| 4 | 6 | 2 |

The A phase is connected between cell 1 and 4, the B phase is connected between cells 3 and 6 and the C phase is connected between cells 5 and 2. Each variable PH has a duration of 60° and each cell is fired with a 120° high frequency pulse train.

The current count of the time counter located in the source phase-locked loop 67 is subtracted from the summing junction 68 and the resultant amount loaded into down counter 69. When down counter 69 reaches zero a signal is sent to the cell firing block 75 which fires the appropriate thyristor pair in phase controlled rectifier 1 in the master channel and sends a signal to increment the variable PH in block 73. To assure a proper load balance between the master and slave channels a separate current regulator comprising elements 53', 55', 59', 60', 61', 68', 69', 71', 73', 75' with the prime elements being configured and functioning the same as their previously described counterparts except that the current feedback signal to summing junction 53' is from the slave channel phase controlled rectifier, a 30° offset in the firing angle is introduced at summing junction 68' and the cell firing signals to fire the next pair of thyristor from cell firing block 75' is coupled to the slave channel phase controlled rectifier 1'.

A motor current flux angle generator 77 in the lower control loop receives a torque command T* and provides a desired angle between motor current and motor flux angle. The motor current/flux angle is modified by multiplier 49 dependent on the flux error signal from gain block 41. The resulting motor current to flux angle is converted to an equivalent firing angle $\alpha$ in motor current flux angle to alpha firing angle translator 79. The firing angle $\alpha$ is added in summer 81 to an offset determined from a look up table 83 which contains six offsets, one for each variable PH value indicative of the next cell pair to be fired. The variable PH is obtained from a counter 84 which is incremented each time inverter 2 is fired. The output of summer 81 is the uncorrected time to fire, which corresponds to the time in degrees to fire the next pair of load side cells in the autosequentially commutated inverter 3 in the main channel.

In summer 87 a delay angle in degrees is subtracted from the uncorrected time to fire to compensate for the delay in current pick up in the line when it is fired due to the controlled current commutating circuit. The delay angle is determined by measuring the three line currents $i_a$, $i_b$, $i_c$ from the master channel inverter using current sensors 89. The difference currents $i_{ab}$, $i_{bc}$, $i_{ca}$ are next determined in a line to delta transformation block 91. A zero crossing detector 93 generates a digital signal when a zero crossing of the difference currents occurs and a three bit segment number indicative of the difference current having the zero crossing. These two sets of signals from the zero crossing detector are provided to a line current pick up detector 95 which determines which thyristor firing is associated with the last zero crossing and the time of the current pick up. The difference between the actual current zero crossing and the intended zero crossing is determined in summer 97. The delay angle error is input to an integrator 99 and the output of the integrator is clamped in limiter circuit 101 with a lower and upper limits of zero and 120°, respectively. The time to fire signal from summer 87 is reduced by the current count of a phase-locked loop 103 in summer 105, to determine the time to go. The time to go is loaded into a down counter 107 which is clocked by a clock signal from the phase-locked loop 103. When the down counter 107 times out the cell firing block 111 fires the next pair of cells in inverter 2 in the master channel. The integrator 37, zero crossing detector 109, the cell firing circuit 111 and the down counter 107 operate in the same manner as the corresponding firing circuitry described in the upper control loop. To determine the firing times for the inverter 1' in the slave channel, the time to go from summer 105 is summed in summer 110 with a 30° signal to fire the slave channel inverter 30 electrical degrees after the master channel inverter. If the output transformer 11 is connected as shown in FIG. 1D, the PH in the slave channel is one count ahead of the master channel. If the output of transformer 11 is connected with the delta secondary connected to the master channel and the wye secondary connected to the slave channel, then PH in the slave channel lags the PH value in the master channel. The adjusted time to go is loaded into a down counter 107' which is clocked by the phase-locked loop 103. When the down counter 107' times out, the firing block 111' fires the next pair of cells in inverter 2' in the slave channel. A more detailed explanation of the operation of the load side firing control including delay compensation is provided in copending application Ser. No. 626,999.

While the two parallel converters are shown supplying a three phase motor with the wye and delta primaries of transformer 11 providing a 30° relative phase shift, it is also possible to supply a six phase motor without the 30° shift introduced by the transformer. When a six phase motor is used the output of each inverter is coupled to a different set of three phase windings.

When a fault condition such as overcurrent or shoot-through occurs in one or both of the channels and is detected in block 113, a signal is provided to a switch controller 115 and to a switch controller 115' (through one input of a two input OR gate 117) causing switches 60 and 60' to couple the voltage command to angle command translators 61, 61' to an inversion limit command (block 119) instead of their respective current regulators 59, 59'. The inversion limit command causes the firing pulses provided to the phase controlled rectifiers 1, 1' to send the phase controlled rectifiers to their inversion limit thereby providing zero current to the two inverters 2, 2'.

To assure proper commutation of the inverter 2 during light load conditions, a six pulse mode block 121 receives the torque command signal T* and the rotor speed signal $\omega_r$ and when light load, high speed conditions exist, as determined by the speed exceeding a predetermined value and the torque being less than a predetermined value, switch 60' is switched by switch controller 115' to couple voltage command to alpha command translator 60' to the inversion limit. With just one channel operating at high speed, light load conditions, the load in the remaining inverter 2 increases keeping its commutation time less than 120° assuring stable operation. The foregoing has described the configuration of FIGS. 1A–D for variable speed motoring operation. The drive configuration of FIGS. 1A–D for synchronization will now be described. During synchronization, which is the time prior to transferring the AC motor directly to the supply mains, the phase error between the supply mains and motor voltages is obtained directly from the instantaneous difference between signals $\theta_s$ and $\theta_L$ from the phase-locked loops 67 and 103, respectively. The signals $\theta_s$ and $\theta_L$ are compared in summer 125 and the resultant phase error is passed through a simple gain block 127 and through a switch SW6 to a summer 129. A speed command $\omega_{sync}$ from the phase-locked loop 67 is coupled through switch SW1 rather than the commanded speed $\omega_r$* to the rate limit block 18. The output of the rate limit block is summed with the output of gain block 127 in summer 129. Switch SW2 disconnects the slip calculator. The speed error is determined in summer 19. The voltage amplitude error between supply mains and the motor is obtained by comparing the absolute value of the source voltage $V_S$ in block 131 properly scaled by gain block 133 with the absolute value of the integrated motor volate $\psi_p$. The properly scaled absolute value of the source voltage $KV_S$ is coupled to summing junction 35 through switch SW3 which disconnects the motor current to flux angle generator 33. Alternatively, the source voltage $V_S$ could be integrated and its absolute value determined prior to comparing it to the motor flux. The error summing junction 35 is coupled to the flux regulator 41. Normally, the flux regulator's setpoint is determined from a programmed flux versus torque from block 33 as commanded from the speed regulator from block 25.

An inverter contactor 135 couples the secondary of transformer 11 to the induction motor 9 when the inverter contactor is closed. A bypass contactor 137 couples the three phase power mains to the induction motor 9 when the bypass contactor 137 is closed. Prior to closing the bypass contactor 137, the source voltage is measured by a transformer (not shown) and the voltage is coupled to the inverting input of amplifier 139 and the motor voltage as measured by a transformer (not shown) is coupled to a noninverting input of amplifier 139. The absolute value of the difference signal from amplifier 139 is determined in absolute value circuit 141. A comparator 143 compares the output of the absolute value circuit to a reference level and provides a logical "1" if the source and motor voltage are equal. Prior to opening the by-pass contactor the absolute values of the inverter master channel current $I_{ML}$ and inverter slave channel current $I_{SL}$ are compared to the absolute value motor current $I_M$ in a summer 145. The absolute value of the inverter master channel current is determined by absolute value circuit 147 coupled to the 3 phase currents by current sensors 89. The absolute value of the inverter slave channel current is determined by absolute value circuit 149 coupled to the three phase currents by current sensors 151. The value of the motor current is determined by the absolute value circuit 153 coupled to the motor three phase currents by current sensors 155. The difference signal from summer 145 is coupled to an absolute value circuit 157. A comparator 159 compares the output of absolute value circuit 159 to a fixed reference level and provides a logical "1" if the motor current is equal to the sum of the inverter motor and slave channel currents and provides a logical "0" if the motor currents are not equal to the sum of the master and slave channel currents.

During desynchronization when the motor is to be transferred from the supply mains to the power conditioner, inverter contactor 135 is closed to connect the inverters 2, 2 and to the motor. Switch SW5 is opened to disable the flux regulator 41. Switch SW4 is positioned to provide a torque command based on motor current $I_M$ which has passed through a rate limit block 161 rather than on a speed command. Comparator 159 checks to determine when the inverter current has increased sufficiently to provide all the motor current so that bypass contactor 137 can be opened.

Figure 1D:
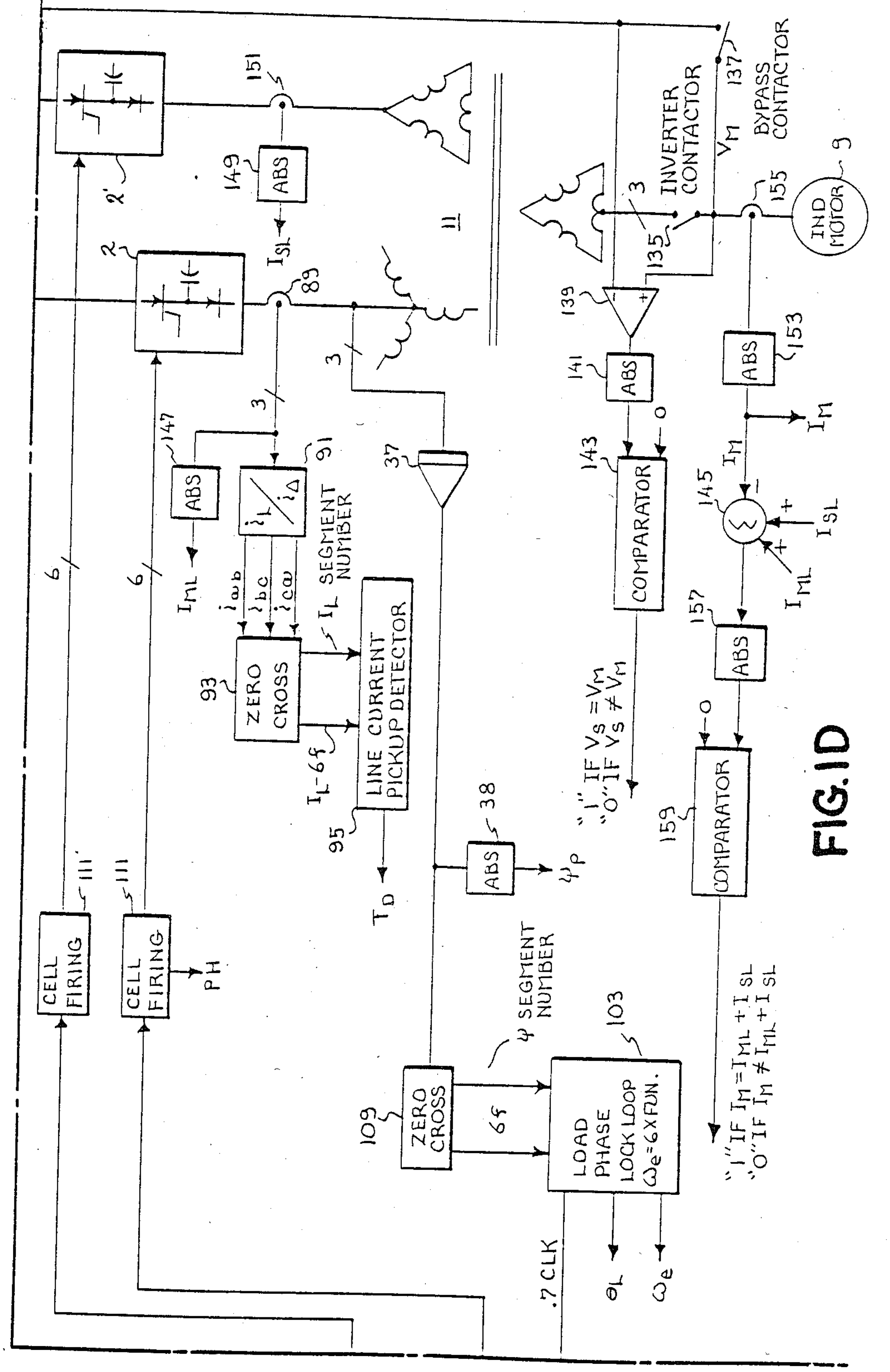
Figure 2A:
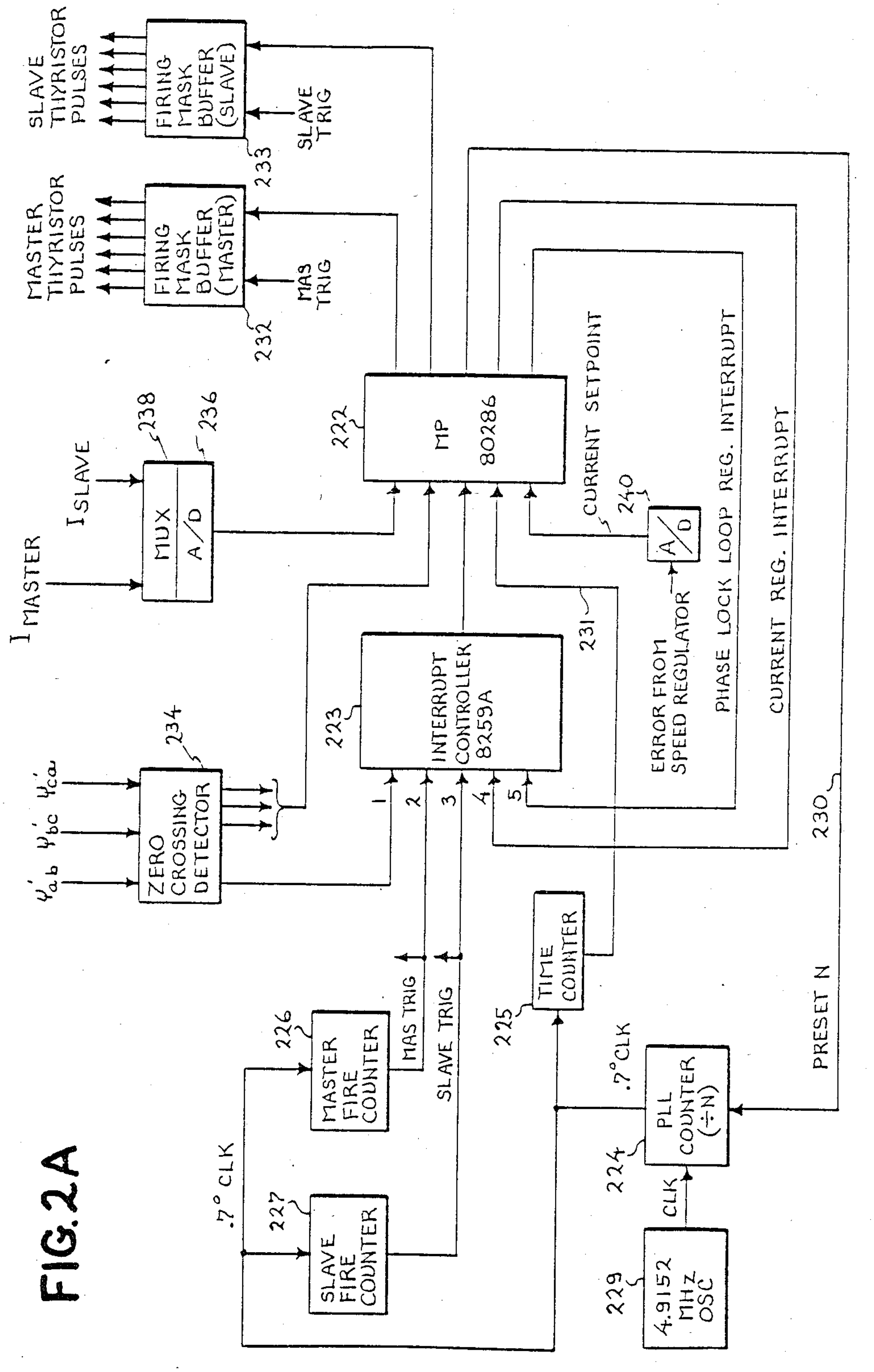
FIGS. 2A and B are hardware diagrams of digital embodiments of the source side and load side converter controls, respectively, of the drive system of FIG. 1.

A digital implementation of the block diagram of FIG. 1 responsive to the speed error signal from summer 19 for firing the phase controlled rectifiers 1, 1', is shown in FIG. 2A. Referring now to FIG. 2A, there is shown an INTEL 80286 microprocessor 222 programmed in the PLM 86 language, having self contained interrupt programs under the control of an INTEL 8259A interrupt controller 223. The controller 223 generates interrupts in a well known fashion which causes the microprocessor 222 to execute some task or calculation and typically store the time to execute some future event into a down counter. When the down counter reaches zero, the counter generates another interrupt which initiates the event, after which the counter is reloaded for the time to execute the next event.

With respect to FIG. 2A, a software phase-locked loop configuration is shown wherein four counters are utilized, namely a phase-locked loop counter 224, a time counter 225, a master fire counter 226 and a slave fire counter 227. In operation, a variable frequency source is created by the phase-locked loop counter 224 by dividing a 4.9152 MHz output pulse train from a clock oscillator 229 by a value N set by a signal "PRESET N" from the microprocessor 222 on a data bus 230. The output of the counter 224 is adapted to be maintained at a frequency 512 times the frequency of the individual flux waves $\psi'_{ca}$, $\psi'_{ab}$ and $\psi'_{bc}$ in the following manner.

The time counter 225 is initially set to 512 and decremented by 1 each clock pulse from counter 224. When counter 225 is decremented to one it resets to 512. Thus counter 225 gives a measure of phase angle relative to the flux waveforms. The count value in the time counter 225 is fed to the microprocessor 222 via data bus 231 where it is used for phase reference for firing the phase controlled rectifier thyristors, not shown, through firing mask buffers 232, 233. Synchronization is achieved by passing the pseudo flux wave forms $\psi'_{ca}$, $\psi'_{ab}$ and $\psi'_{bc}$ through a zero crossing detector 234 which generates a synchronizing pulse every time a flux wave passes through zero. These pulses are fed to the interrupt controller 223 which interrupts the microprocessor 222 and initiates a crossover service program. The zero crossing detector 234 also generates a three bit number indicating the relative signs of the motor flux waveforms, which number is fed to and read by the microprocessor 222 and is used to identify which zero crossing has caused the interrupt pulse. The zero crossover service program reads the value in the time counter 225 and compares it to the correct value for the particular flux wave crossing to generate a phase error between the counter 225 and the flux waves. This error is used to calculate a new "PRESET N" value which is then loaded into the phase-locked loop counter 224.

The timing of the firing of each thyristor cell in the phase controlled rectifiers 1, 1' is accomplished by means of the fire counters 226 and 227. When the master fire counter 226 is clocked down to zero, a master trigger interrupt signal is generated and provided to the interrupt controller 223 and to the firing mask buffer 232 which has been loaded with the appropriate mask from microprocessor 222 for the next cell pair of the master phase controlled rectifier 1 to be fired. Similarly, when the slave fire counter 227 is clocked down to zero, a slave trigger interrupt signal is generated and provided to the interrupt controller 223 and to the firing mask buffer 233 which has been loaded with the appropriate mask from microprocessor 222 for the next cell pair of the slave phase controlled rectifier 1'. the microprocessor receives the DC link currents from the master channels and the slave channel from an A/D converter 236 which is coupled to a multiplexer 238 which is coupled to the two signals. The microprocessor also receives the error signal from a speed regulator through an A/D converter 240. After a cell firing, the microprocessor 222 computes the time to fire the next cell in that phase controlled rectifier. This time is compared to the value in the time counter 225 which corresponds to current time. The difference in the time to go is then loaded into the fire counter 226 or 227 via the data bus, which then decrements to zero causing yet another interrupt through the interrupt controller 223 which initiates a cell firing program.

Figure 2B:
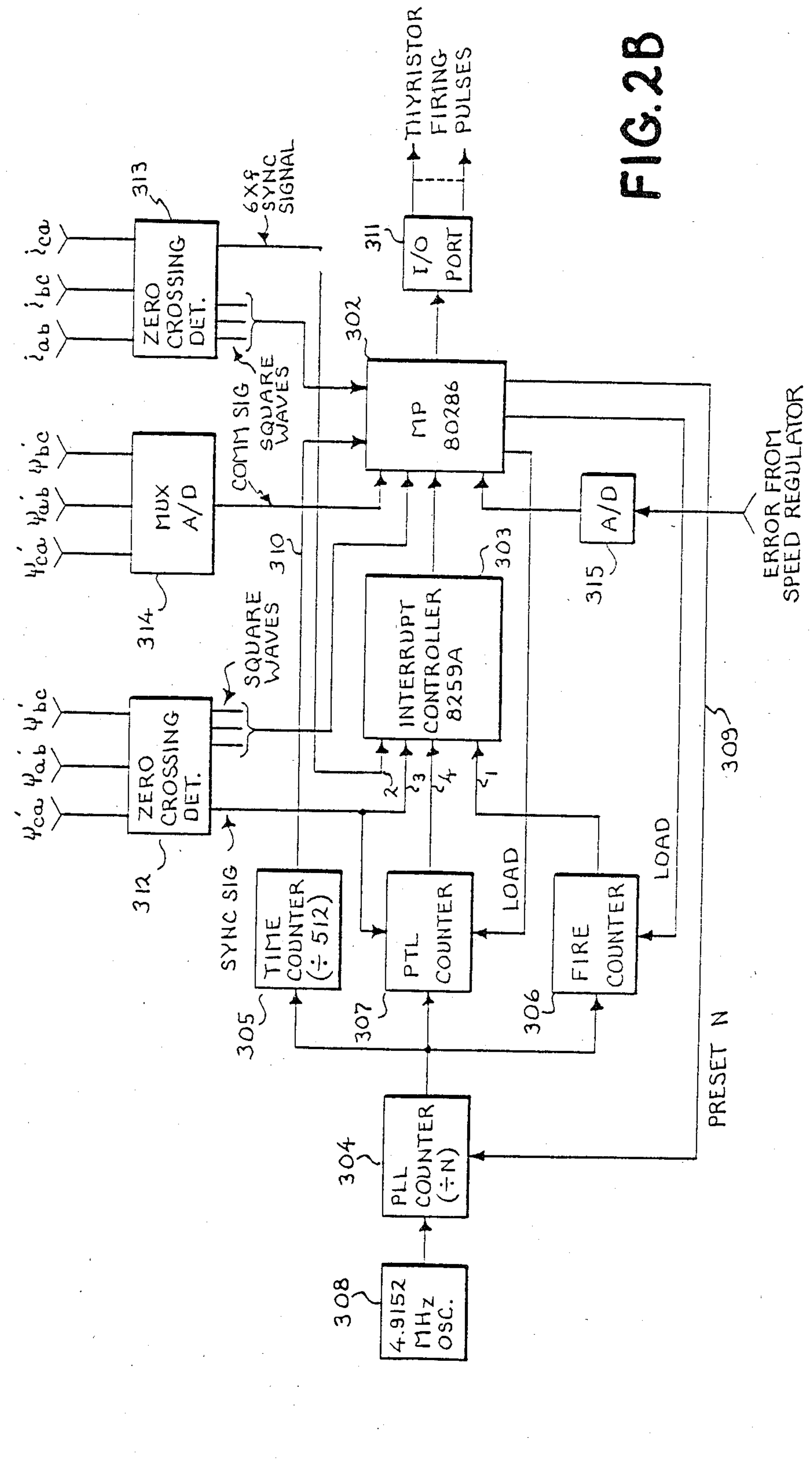

A digital implementation of the portion of the block diagram of FIG. 1A–D responsive to the speed error signal from summer 19 for controlling the firing of inverters 2,2' is shown in FIG. 2B. Referring now to FIG. 2B, there is shown an INTEL 80286 microprocessor 302 programmed in the PLM 86 language, having self contained interrupt programs under the control of an INTEL 8259A interrupt controller 303. The controller 303 generates interrupts in a well known fashion which causes the microprocessor 302 to execute some task or calculation and typically store the time to execute some future event into a down counter. When the down counter reaches zero, the counter generates another interrupt which initiates the event, after which the counter is reloaded for the time to execute the next event.

With respect to FIG. 2B, a software phase-locked loop configuration is shown wherein four counters are utilized, namely a phase-locked loop counter 304, a time counter 305, a fire counter 306 and a pulse train limit counter 307. In operation, a variable frequency source is created by the phase-locked loop counter 304 by dividing a 4.9152 MHz output pulse train from a clock oscillator 308 by a value N set by a signal "PRESET N" from the microprocessor 302 on a data bus 309. The output of the counter 304 is adapted to be maintained at a frequency 512 times the frequency of the individual flux waves $\psi'_{ca}$, $\psi'_{ab}$ and $\psi'_{bc}$, in the following manner.

The time counter 305 is initially set to 512 at a particular flux wave crossover and decremented by 1 each clock pulse from counter 304. When counter 305 is decremented to one it resets to 512. Thus counter 305 gives a measure of phase angle relative to the flux waveforms. The counter value in the time counter 305 is fed to the microprocessor 302 via data bus 310 where it is used for phase reference for firing the inverter cell, not shown, through a digital I/O port 311. Synchronization is achieved by passing the pseudo flux wave forms $\psi'_{ca}$, $\psi'_{ab}$ and $\psi'_{bc}$ through a zero crossing detector 312 which generates a synchronizing pulse every time a flux wave passes through zero. These pulses are fed to the interrupt controller 303 which interrupts the microprocessor 302 and initiates a crossover service program. The zero crossing detector 312 also generates a three bit number indicating the relative signs of the motor flux waveforms, which number is fed to and read by the microprocessor 302 and is used to identify which zero crossing has caused the interrupt pulse. The zero crossover service program reads the value in the time counter 305 and compares it to the correct value for the particular flux wave crossing to generate a phase error between the counter 305 and the flux waves. This error is used to calculate a new "PRESET N" value which is then loaded into the phase-locked loop counter 304.

There can be a substantial delay between the application of a firing signal to a thyristor and the time when line current is initiated in a controlled current inverter supplying an induction motor, especially at high motor speed and light motor load. This delay is caused by the fact that the commutating capacitors are charged such that initially the particular divide in series with the thyristor being fired is reversed biased and the line current doesn't pick up to that phase until the commutation capacitor has discharged through the load. To preserve the desired relationship between motor flux and current, this delay has to be compensated for. The time at which the line current actually picks up is measured by zero crossing detector 313 monitoring the zero crossings of the motor line difference currents to generate an interrupt signal to the interrupt controller 303 every time a zero crossing is detected. The interrupt controller interrupts microprocessor 302 and initiates a delay determination program. The zero crossing detector 313 also generates a three bit number indicating the relative signs of the motor difference currents, which number is fed to and read by microprocessor 302 and is used to identify which thyristor is associated with a zero crossing. The delay determination program compares the current crossing time and the uncorrected time to fire (based on the angle command and offset) and inputs this value through a gain to a software integrator to obtain the delay angle. The delay angle is clamped between zero and 120°. Also since the commutation delay is a constant time phenomenum, the need to compensate the delay decreases as a function of speed. Therefore, since the sampling rate of the compensator occurs at six times load frequency, this essentially makes the gain of the regulator loop track frequency, inherently stabilizing the compensator.

The time to fire is then determined as the uncorrected time to fire less the delay angle. The time to go is determined by subtracting the time counter reading from the time to fire so that when the time to go, which is measured in degrees, is loaded into the down counter and the down counter clocks down to zero count, an interrupt is generated which calls for the next cell firing.

The timing of the firing of each thyristor cell in the inverter 2 is accomplished by means of the fire counter 306. After a cell firing, the microprocessor 302 computes the time to fire the next cell. This time is the uncorrected time to fire less the integrated delay angle. This time is compared to the value in the time counter 305 which corresponds to current time. The difference is the time to go which is then loaded into the fire counter 306 via the data bus, which then decrements to zero causing yet another interrupt through the interrupt controller 303 which initiates a cell firing program.

Figure 3:
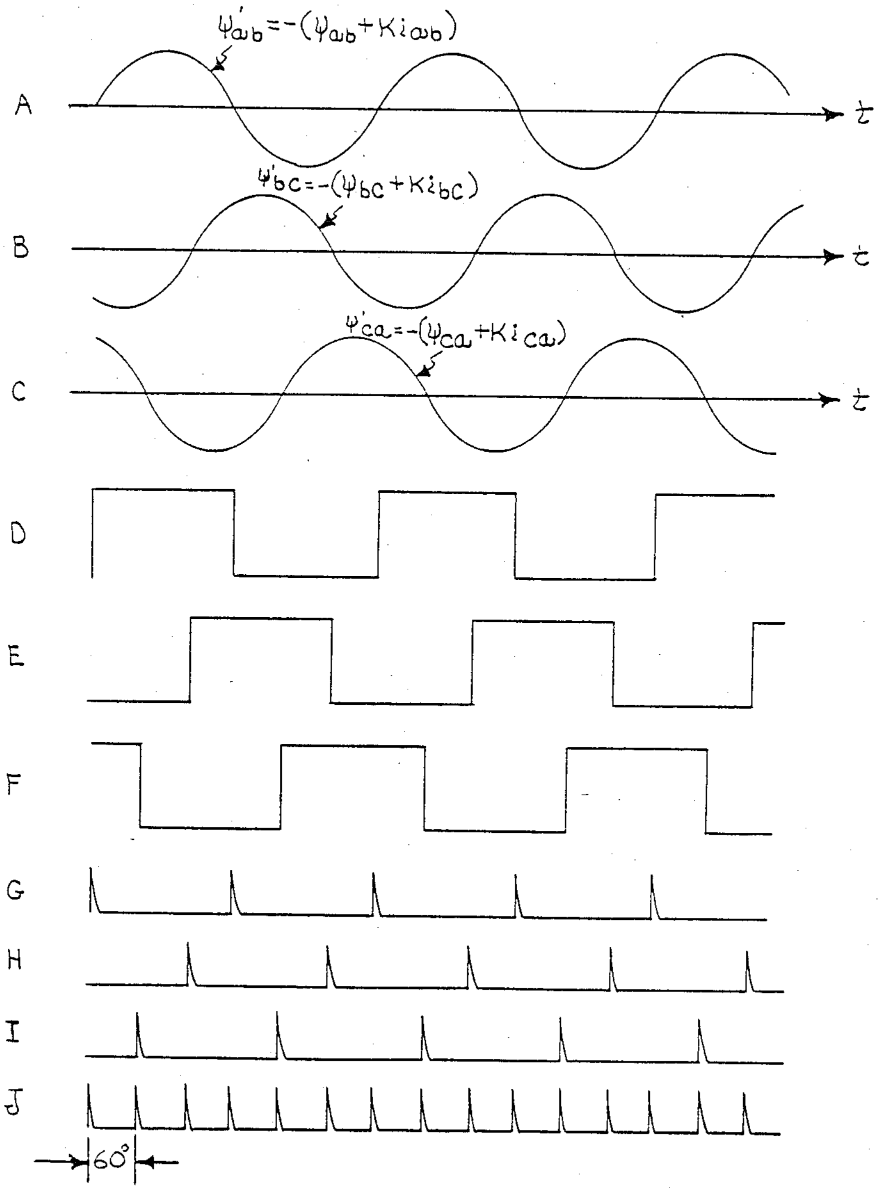
FIGS. 3A–J are waveform diagrams on a common time scale helpful in explaining the operation of the present invention.

Referring to FIG. 3A the integrated line to line voltage $V_{ab}$ ($\psi_{ab}$) summed with delta current $i_{ab}$ scaled by a factor K proportional to the commutation inductance is shown ($\psi'_{ab}$). The waveform in FIG. 3A is generally sinusoidal having well defined zero crossings notwithstanding the occurence of commutation notches in the phase voltages. FIGS. 3B and 3C show integrated line to line voltages $V_{bc}$ and $V_{ca}$ each summed with the appropriately scaled delta currents.

The phase-locked loop comprises two counters (the phase lock loop counter and the time counter) and three comparators providing three logic bits for the computer (their states depending on the polarity of the integrated source or load line-to-line voltage). The output of the three comparators are shown in FIGS. 3D, E and F, respectively. These three bits identify instantaneous angular relationship of the three phase voltages within 60°. The comparator outputs are also used to derive in hardware an interrupt pulse on each zero crossing of the integrated voltages; that is, an interrupt is generated very 60° as illustrated in FIGS. 3G, H, I and J.

In operation, the phase-locked loop counter is a down counter clocked at 4.9152 MHZ and loaded with a divide by N value such that the counter counts down to zero and generates an output pulse 512 times per source or load voltage fundamental frequency period. Thus the phase-locked loop counter provides a 360°/512 or 0.703° clock pulse which is used to clock the fire counter, the time counter, and in the case of the load side the pulse train limit counter, all three of which are down counters. The time counter in the load side is initially loaded with a count of 512 at a time corresponding to the minus to plus transition of the integrated $V_{bc}$ voltage, which also corresponds to the plus to minus transition of the phase voltage $V_{an}$. When the time counter counts down to 1, it reloads itself to 512 and continues to decrement one count every clock pulse. The operation of the source side time counter is similar except that for rather arbitrary reasons the initial load of 512 to the time counter occurs at the minus to plus transition of the phase voltage $V_{an}$ or 180° displaced from the load side time counter. This displacement between time counters must be accounted for in phase synchronizing the load voltage to the source voltage.

The objective of the phase-locked loop is to regulate the divide by N load into the phase lock loop counter such that the clock pulse out of the phase lock loop counter will be at 512 times fundamental frequency. While the details vary over the load side frequency range of 0–120 Hz, and somewhat between source and load sides, the concept remains the same. When a zero crossing of the flux waves (integrated line-to-line voltage) occurs, a high priority interrupt program occurs which reads the time counter and the three comparator bits to identify which zero crossing occurred. The correct value of the time counter for a particular zero crossing is known and the difference between the correct and actual value represents an error signal which is input to a proportional plus integral regulator. The output of the regulator is the updated divide by N load for the phase lock loop counter.

The time counter therefore provides angular position, $\theta$, to a resolution of 0.703° and the fundamental frequency of the voltage waves is proportional to a constant times the reciprocal of the calculated divide by N load value. This derived value of frequency is used as the speed feedback signal for synchronous motor drives and, corrected for slip, then used as the speed feedback for the induction motor drives. However, when commanded to synchronize to the supply mains, the speed regulator is changed to a frequency regulator and thus the slip correction to the load frequency is no longer done for the induction motor drive.

One object of the synchronizing control is to equalize the source and load frequencies as derived from the divide by N loads for the source and load phase lock loop counters and furthermore to synchronize the angular position $\theta$ of the source and load sides by equalizing the instantaneous values of the source and load time counters after correction for any arbitrary displacement.

Figure 4:
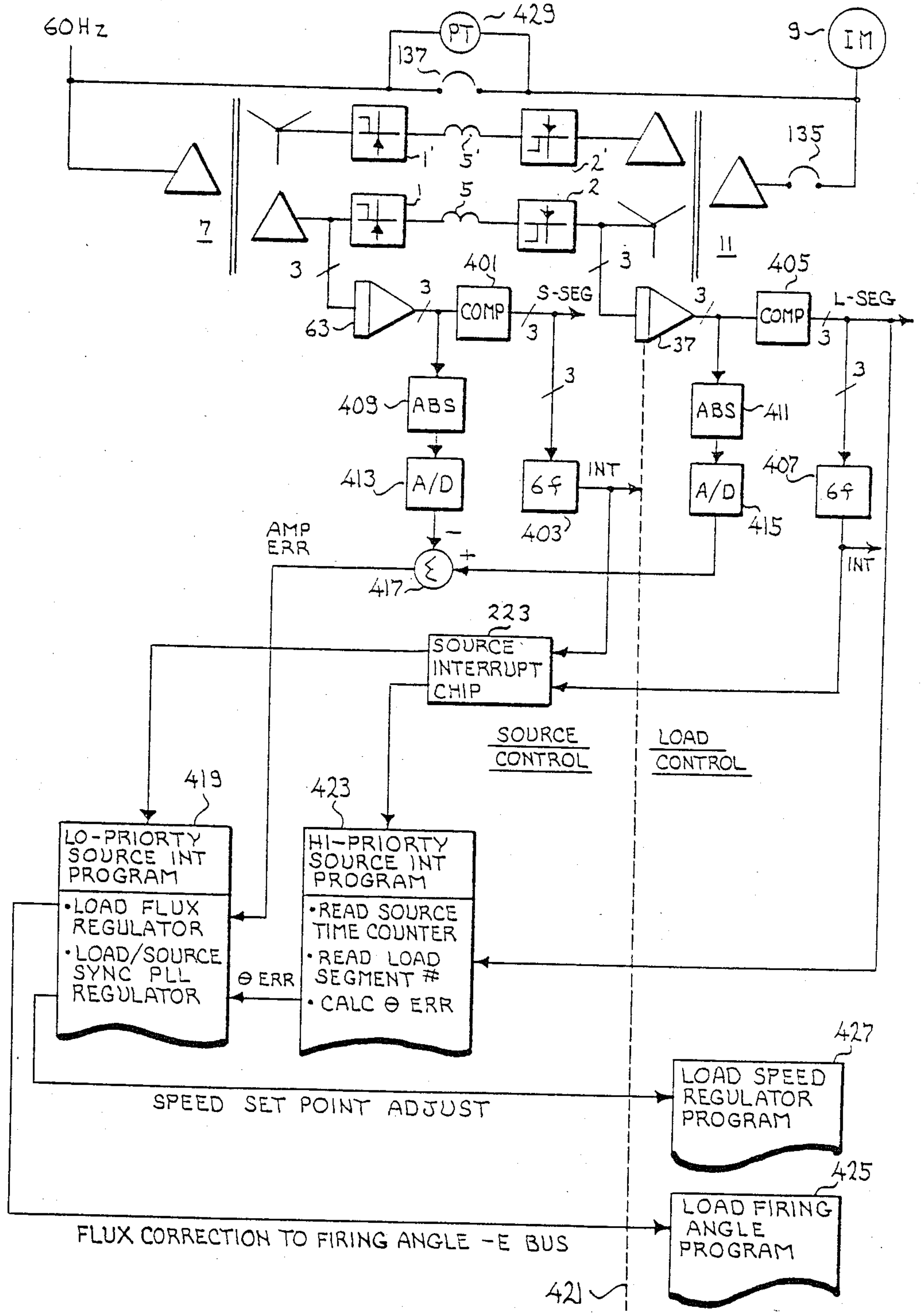
FIG. 4 is a simplified block diagram of the synchronizing control of the present invention.

Referring now to FIG. 4, a simplified block diagram for the synchronizating control of the present invention is shown. As is also shown in FIGS. 1A–D transformer 7 couples a master channel, comprising source converter 1, inductor 5 and load converter 2, and slave channel, comprising elements 1', 5' and 2' to a three phase supply mains. Transformer 11 couples the two channels to an induction motor 9 through an inverter contactor 135. The supply mains are directly coupled to the motor through a bypass contactor 137. Integrator 63 is coupled to the source voltage in the master channel to generate integrated line voltage signals. Comparators 401 determine the source segment numbers. A signal equal to 6 times the fundamental frequency of the 60 Hz source is determined from the comparators 401 outputs in the zero crossing detectors of block 403. Integrator 37 is coupled to the inverter voltage in the master channel to generate motor flux signals and comparators 405 generate segment numbers. A signal equal to six times the fundamental frequency supplied to the motor is determined in zero crossing detectors in block 407 from the segment numbers from comparators 405. The absolute values of the integrated voltage and flux waves are determined in blocks 409 and 411, respectively. After analog to digital conversions of the two signals in blocks 413 and 415, respectively, the two signals are compared in summing junction 417 and supplied to a low priority program 419 in the microprocessor 222 in the source control. The signal representative of 6 times the fundamental frequency of the load is coupled to the source interrupt chip 223. All signals in FIG. 4 crossing dotted line 421 are communicated on a communication bus between the load and source microcomputers 302 and 222, respectively.

The source interrupt chip 223 provides interrupt signals to a low priority program 419 and a high priority source program 423. The segment numbers from the load control are provided to a high priority source program 423.

The output of the low priority source interrupt program 419 is a flux correction to firing angle signal communicated to the load control firing angle program 425 in the load microcomputer and a speed set point adjustment to the load speed regulator program 427 also in the load microcomputer.

The operation of FIGS. 1A–D, 2A and B and 4 will now be explained. To derive the phase error between source and load voltages, the load side "flux" wave zero crossing signal and the three load side comparator bits identifying which 60° interrupt occurred are sent to the source side control from block 407 and comparator 405, respectively. The zero crossing signal generates a high priority interrupt program 423 in the source control which looks at the three load side comparator bits and for those zero crossings, representing either a plus or minus zero crossing of the integrated $V_{bc}$ load voltage, the source side time counter is read. If the source and load voltages were in synchronization then the correct source side time counter reading for any particular load side zero crossing interrupt is known. Thus the difference between the actual source time counter reading and the known correct reading at the time of a particular load size zero crossing interrupt represents the phase error between the source and load voltages.

Assume the motor is being driven by the power conditioner and the command is given to transfer to the supply mains. The speed setpoint is changed to a frequency setpoint equal to the frequency of the supply mains and passed through a rate limit and then to the speed regulator. The frequency set point can be generated from the supply mains or from the source phase-locked loop. When the speed feedback is within a preset tolerance of the speed setpoint, then the phase regulator and the voltage equalization regulator are activated simultaneously.

The phase regulator consists of passing the source/load phase error determined above through a gain block and summing the resultant signal with the speed (frequency) setpoint such that the load output frequency moves to null the phase errors; that is, if the load phase is lagging the source phase the phase error will increase the frequency setpoint to increase the motor torque so as to null the phase error.

Even though the phase error passes through a simple gain block, the regulator is a type 1 system in that there is an inherent integration in the loop by virtue of the speed to position transformation of the phase feedback signal. Thus the loop will regulate the phase error to zero. If the inherent integration is not recognized and a phase regulator with a proportional plus integral regulator with a 0.1 rad/sec. crossover feeding into the speed regulator with a 1 rad/sec is used, for example, very sluggish system operation with unacceptable performance would result.

With the simple gain phase regulator, the response of the phase regulator is comparable to that of the speed regulator. For reasons to be discussed, it was found necessary to increase the gains of the speed regulator by about 4;1, that is, goind to a 4 rad/sec loop crossover when going into the synchronization mode. Without this speed regulator gain increase, the phase regulator tended to modulate 30° from its desired value as if there was a loop disturbance trying to drive the regulator away from its null point. This disturbance can be described with the aid of FIGS. 5A–D.

Figure 5A:
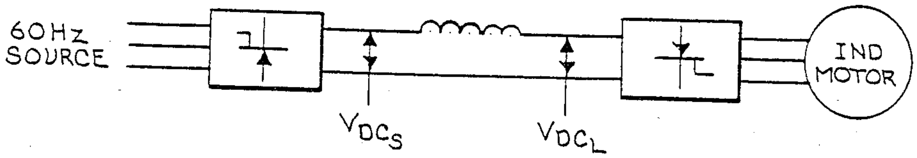
FIG. 5A shows a six-pulse controlled current inverter induction motor drive defining the variables shown in waveform diagrams FIGS. 5B–D which waveforms are helpful in explaining the operation of the present invention.
Figure 5B:
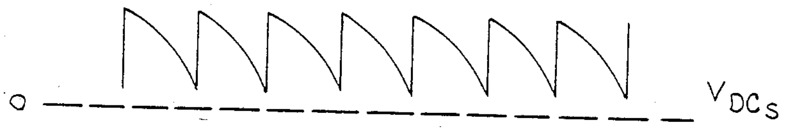
Figure 5C:
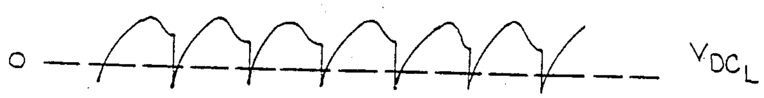
Figure 5D:

Consider first a six pulse controlled current inverter-induction motor drive system shown in FIG. 5A. Typical DC link voltage waveforms at both sides of the DC link reactor are shown in FIG. 5B and C. The difference between these two waveforms as shown in FIG. 5D is the voltage impressed across the DC link reactor and this gives rise to a current ripple in the DC link which causes a small torque disturbance into the motor. If the master channel source converter 1 is connected to the delta secondary of transformer 7 and the master channel load inverter 2 is connected to the delta secondary of transformer 7 and the master channel load inverter 2 is connected to the delta secondary of transformer 11, the ripple current through link inductor 5 is maximized when the motor voltage at transformer 11 primary is synchronized with the source voltage at transformer 7 primary. This in turn maximizes the torque disturbance and for a low inertia load system can create a small speed disturbance trying to force the phase regulator away from the point at which it is trying to operate. The extra gain in the speed regulator helped overcome this torque disturbance and removed the phase modulation about the desired operations point. It must be pointed out that increasing the response of the voltage equalizing regulator to be discussed also helped overcome this disturbance, but in our final system, for other reasons, we chose to put the added gain the speed regulator.

The preferred embodiment of the controlled current inverter induction motor drive is a twelve pulse system with the power conversion bridged rated at 700–900 volts. Since most of the motors to be drive are 4160 volts, 4160:800 volt transformers at both the input and output side of the power converters are used. Typically these transformers are delta input with delta and wye secondaries to give two sets of 30° displaced 3 phase voltages. The control of the two channels is similarly displaced 30°. This gives twelve pulse operation; that is, the fifth and seventh harmonics are removed from the input and output current waveforms. With regard to the phase synchronizing problem with a transformer/bridge configuration having the channel with the delta secondary winding of transformer 7 also having the delta primary of transformer 11, the problem is twice as bad as the six pulse system because both six pulse channels add to the problem. However, it was determined that by simply interchanging the output transformer windings, that is, connecting the delta primary windings of transformer 11 to the channel with the wye secondary transformer 7 and the wye primary windings of transformer 11 to the channel with the delta secondary of transformer 7, as shown in FIGS. 1A–D and 4, and accounting for this phase shift in the control, the phase synchronizing is simplified in that zero phase error between the source and load voltages at the high voltage side of the transformer occurs at minimum ripple current in the DC link reactors rather than at maximum ripple current. No penalties result from the switching the connection of the transformer. The present invention can be operated without switching the connection of the transformer and in drives not using a transformer to couple the inverters to the motor.

As forementioned, when the command has been given to synchronize the motor to the line, and the motor and supply frequency are equal, simultaneously the phase and voltage equalization regulators are activated. The phase synchronization regulator has just been discussed. The voltage equalization is accomplished in the induction motor drive by switching the flux regulator setpoint from the flux versus torque command profile block 33 to the integrated or properly scaled supply voltage amplitude $KV_S$ from block 133. To prevent a current transient, the flux regulator setpoint is ramped from the one state to the other. The flux regulator 41 is a proportional plus integral regulator of approximately 1 rad/sec crossover. This regulator is shown in FIGS. 1A–D. Note that the flux regulator operations on both the source current regulator and the load firing angle regulator. At light load the flux regulation is accomplished primarily through current, at heavy load, flux regulation is accomplished primarily through load angle control.

Once the command had been given to transfer the motor to the line and both the phase and voltage have been equalized within precribed tolerances, a double check is made by potential transformers 429 in FIG. 4 on either side of the bypass contactor that zero voltage exists across the contractor, and then the bypass contactor is closed. Subsequently the contactor between the inverter and the motor is opened. Typically once the motor has reached 60 Hz about 1 second is required to phase synchronize and voltage equalize prior to closing the bypass.

This describes the transfer of the motor from the power conditioner to the sypply main. The other half of the problem is transferring the motor back to the power conditioner on command to de-synchronize. This is accomplished by closing the contactor from the motor to the power conditioner while the bypass contactor is still closed but before firing thyristors in the power converter. The control is in the idle mode and since motor voltage exists, the load side phase-locked loop is synchronized to this motor/supply volage. Once the source and load side phase-locked loops are synchronized to their respective voltages within a prescribed tolerance, then a load side diametric is applied. A load side diametric is applied by shorting both load side six pulse channels by commanding two thyristors connected to the same motor phase to fire, and at the same time commanding a current from the source side convertors to limit current flow. The purpose of the diametric is to build up a current in the DC link so that on firing out of the load side diametric with the proper thyristor firing, the commutating capacitors will be sufficiently charged to commutate load current on the following firing. As the load side fires out of its diametric the source side ramps up its current to the value currently in the motor being supplied by the supply mains. During this time the speed regulator in the power converter is disabled, with the power converter essentially operating as a torque controller. In addition to supplying the right current value and having the load side synchronized to the motor voltage, the load side should be firing at the correct angle. This is determined by using the same firing angle versus torque profile used when operating as a motor drive, that is, the firing angle will track the commanded torque. When the sum of the currents in the two six pulse converter channels equals the motor current, the current being supplied by the supply mains is zero and therefore the bypass contactor is opened and at the same time the power converter speed regulator and flux regulator are activated, taking care to initialize the speed regulator output to the current presently being supplied and similarly ramping the flux regulator setpoint down from the existing flux level to the normal value commanded by the torque versus flux profile in block 33 of FIGS. 1A–D.

The preferred embodiment in the present invention is a 12 pulse induction motor drive. The present invention is applicable to six pulse AC motor drives having a source converter and load converter each using a phase-locked loop to control converter firings.

The same procedures are applicable to synchronous motor drives such as the one shown in U.S. Pat. No. 4,449,087 to achieve synchronization except that the flux regulator would work on a field controller to accomplish the voltage equalization function and there would be no need to establish the diametric path in the load side converter in the de-synchronization process, since the inverter in the synchronous motor drive is load commutated and therefore does not have commutating capacitors.

The foregoing describes a control for transferring in a bumpless manner a motor from a power conditioner to a supply mains or from a supply mains to a power conditioner in a motor drive having a source converter and a load converter each using a phase-locked loop to control converter firings without requiring additional hardware.

While the invention has been particularly shown and described with reference to a preferred embodiment thereof, it will be understood by those skilled in the art that various changes in form and details may be made therein without departing from the spirit and scope of the invention.

```
$EJECT
/*****************************************************************************************/
/*                                                                                       */
/* FUNCTION             : DETERMINE SPEED SET POINT                                     */
/* CALLING SEQUENCE     : CALL DET$SPD$SP                                               */
/*                                                                                       */
/* INPUTS   :: E$DATA.ALT$SPD  E$DATA.SPD$SP$MODE  E$DATA.SPD$REF   SPD$TEST$MAX   MAX$RUN$SPD$6P  BTH$SPD$1 */
/*             BTH$SPD$0        TOP$SPD$0           TURNING$GEAR$SPD  TOP$SPD$1      MIN$RUN$SPD     */
/* OUTPUTS  : E$DATA.SPD$STP                                                            */
/*                                                                                       */
/* DET$SPD$SP DETERMINES THE SPEED SET POINT FROM ONE OF THE AVAILABLE MODES BELOW. THE SELECTION IS A */
/* FUNCTION OF EDATA.SPD$SP$MODE.  FOLLOWING IS A BRIEF SUMMARY OF THE MODES.          */
/*                                                                                       */
/* SCALING NOTES:  RAW$SPD$REF : 0-7FFH = 0-+10V   = SPEED REF                          */
/*                 SPD$STP     : 0-2AAH = 0-1PU SPD = SCALED SPEED REF                  */
/*                                                                                       */
/* MODE 0 : RAW$SPD$REF IS READ FROM CHANNEL 1 LOAD-SIDE HAIA A/D CONVERTER.  IT USUALLY IS FROM THE PURCHASER */
/*          REMOTE 4-20mA REFERENCE. BTH$SPD$PROCESS$H IS THE BOTTOM SPEED THE PURCHASER WANTS TO BE AT FOR */
/*          MINIMUM REFERENCE (4mA). TOP$SPD$PROCESS$H IS THE TOP SPEED THE PURCHASER WANTS TO BE AT FOR */
/*          MAXIMUM REFERENCE (20mA). IF THE REFERENCE IS LOST THE ma TO volts CONVERTER WILL GO NEGATIVE, */
/*          SPD$STP IS LOCKED (=SPEED) AND BIT 2 OF LOSS$SPD$CNT IS SET.                */
/*                                                                                       */
/* MODE 1 : RAW$SPD$REF IS READ FROM CHANNEL 0 LOAD-SIDE HAIA A/D CONVERTER. IT IS THE 0-10V SPEED REFERENCE */
/*          OFTEN FROM THE PURCHASER - IF NOT THEN FROM DRIVE PANEL.                    */
/*          BTH$SPD$1$H IS THE SPEED TO RUN AT FOR MIN REF (0V).                        */
/*          TOP$SPD$1$H IS THE SPEED TO RUN AT FOR MAX REF (10V).                       */
/*                                                                                       */
/* MODE 2 : SPD$STP = EDATA.ALT$SPD WHICH IS THE REFERENCE FROM THE OTHER CHANNEL OF THE DRIVE IN A TWELVE PULSE */
/*          SYSTEM.  IT MAKES THIS UNIT A SLAVE TO THE OTHER UNIT.                      */
/*                                                                                       */
/* MODE 3 : SPD$STP = E$DATA.SPD$REF WHICH IS THE REFERENCE FROM THE SOURCE SIDE APPLICATION PROGRAM. */
/*                                                                                       */
/* MODE 4 : SPD$STP = TOP$SPD$PROCESS$H. THIS IS USED TAKE THE DRIVE TO THE TOP SPEED THE PURCHASER WANTS. */
/*                                                                                       */
/* MODE 5 : SPD$STP = BTH$SPD$PROCESS$H. THIS IS USED TO TAKE THE DRIVE TO MINIMUM SPEED OF THE PURCHASER */
/*                                                                                       */
/* MODE 6 : SPD$STP = SPD$STR. THIS LOCKS THE DRIVE SPEED AT ITS PRESENT VALUE.        */
/*                                                                                       */
/* MODE 7 : RAW$SPD$REF IS READ FROM CHANNEL C OF THE LOAD-SIDE HAIA A/D CONVERTER. IT IS THE TEST 0-10V INPUT. */
/*          IT IS SOMETIMES USED AS A PURCHASER'S THIRD INPUT.  THERE IS NO SCALING CONTROL OF THE INPUT */
/*          0V = MIN SPEED    10V = MAX SPEED                                            */
/*                                                                                       */
/* MODE 8 : SPD$STP = TURNING$GEAR$SPD$H. THE DRIVE TURNS AT THE TURNING GEAR SPEED. NOTE THAT THE MINUMUM */
/*          CLAMPS ARE REMOVED FOR THIS FUNCTION AS LOWER SPEEDS ARE OFTEN NEEDED.      */
/*                                                                                       */
/* MIN$RUN$SPD$CLMP$H - THE MIN SPEED THE PURCHASER EXPECTS TO RUN AT (USED IF THE MIN IS > ABOVE'S 10%) */
/* SPD$REF$CLMP$MAX$H - THE MAX SPEED THE PURCHASER EXPECTS TO RUN AT (SHOULD NOT EXCEED 100% OR 2AAH) */
/* MAX$RUN$SPD$6P$H   - THE MAX SPEED THE DRIVE IS ALLOWED TO RUN AT WHEN IN SIX-PULSE MODE */
/*                      IT SHOULD BE LESS THAN MAX$RUN$SPD$6P IN 12-P UNIT.            */
/*                                                                                       */
/* IF BIT 7 OF EDATA.SPD$SP$MODE IS SELECTED THEN THIS CHANNEL IS A SLAVE AND SPD$REFERENCE IS DERIVED FROM THE */
/*      OTHER CHANNEL VIA RS232 COMMUNICATION LINK AS EDATA.ALT$SPD.                   */
/* THE SPD$SP$MODE IS LIMITED TO 8 MODES. IF MORE ARE ASKED FOR IT DEFAULTS TO MODE 6  */
/*                                                                                       */
/*****************************************************************************************/
```

```
                $EJECT
 86   1         DET$SPD$SP: PROCEDURE                                                /* DETERMINE SPEED SET POINT        */
 87   2         SPD$SP$MODE = (EDATA.SPD$SP$MODE AND 07FH);
 88   2         RAW$SPD$REF = EDATA.RAW$SPD$REF;
 89   2         SPD$PASS$FLG = FALSE;
 90   2         IF SPD$SP$MODE > 8H
                   THEN  SPD$SP$MODE = 6H;
 92   2         DO CASE SPD$SP$MODE;
 93   3         D   DO;                                                              /* MODE 0 - REMOTE 4-20 mA REF     */
 94   4               IF RAW$SPD$REF < -10H                                          /*           SPD B                 */
                         THEN DO;
 96   5                        SPD$REFERENCE = SPD$STR;
 97   5                        LOSS$SPD$CNT = LOSS$SPD$CNT OR 04H;
 98   5                     END;
 99   4                  ELSE DO;
100   5                        LOSS$SPD$CNT = LOSS$SPD$CNT AND 0FBH
101   5                        IF (RAW$SPD$REF < 0H)
                                 THEN  RAW$SPD$REF = 0;
103   5                        IF SPD$SCL = 0H
                                 THEN SPD$SCL = UNSIGN(07FFFH/(TOP$SPD$PROCESS$H - BTM$SPD$PROCESS$H));
105   5                        SPD$REFERENCE = BTM$SPD$PROCESS$H + INT( SHL(UNSIGN(RAW$SPD$REF),4)/SPD$SCL);
106   5                     END;
107   4             END;
108   3             DO;                                                              /* MODE 1 PURCHASER'S 0-10V REF    */
109   4               IF RAW$SPD$REF < 0                                             /*           SPD A                 */
                         THEN  RAW$SPD$REF = 0;
111   4               IF SPD$SCL$1 = 0H
                         THEN  SPD$SCL$1 = UNSIGN(07FFFH/(TOP$SPD$1$H - BTM$SPD$1$H));
113   4               SPD$REFERENCE = BTM$SPD$1$H + INT( SHL(UNSIGN(RAW$SPD$REF),4)/SPD$SCL$1);
114   4             END;
115   3             DO;                                                              /* MODE 2    UNUSED                */
116   4               SPD$REFERENCE = SPD$STR;                                       /* (HOLD REFERENCE)                */
117   4             END;
118   3             DO;                                                              /* MODE 3    UNUSED                */
119   4               SPD$REFERENCE = SPD$STR;                                       /* (HOLD REFERENCE)                */
120   4             END;
121   3             DO;                                                              /* MODE 4 UP CONTACT REF           */
122   4               SPD$REFERENCE = TOP$SPD$PROCESS$H;
123   4             END;
124   3             DO;                                                              /* MODE 5 DOWN CONTACT REF         */
125   4               SPD$REFERENCE = BTM$SPD$PROCESS$H;
126   4             END;
127   3             DO;                                                              /* MODE 6 HOLD REFERENCE           */
128   4               SPD$REFERENCE = SPD$STR;
129   4             END;
130   3             DO;                                                              /* MODE 7    UNUSED                */
131   4               SPD$REFERENCE = SPD$STR;                                       /* (HOLD REFERENCE)                */
132   4             END;
133   3             DO;                                                              /* MODE 8 TURNING GEAR SPEED       */
134   4               SPD$REFERENCE = TURNING$GEAR$SPD$H;
135   4             END;
136   3         END;                                                                 /* CASE SPD$SP$MODE                */
137   2         EDATA.SPD$REF = SPD$REFERENCE;
138   2         IF SYNC$ENABLE
                   THEN  SPD$STP = SYNC$SPD$STP$H;                                   /* SYNCHRONIZING FUNCTION          */
140   2            ELSE  SPD$STP = SPD$REFERENCE;                                    /* ELSE NORMAL OPERATION           */
141   2         IF SPD$SP$MODE <> 08H                                                /* CLAMP SPEED SET POINT           */
                   THEN DO;
143   3                  IF SPD$STP < MIN$RUN$SPD$CLMP$H
                            THEN  SPD$STP = MIN$RUN$SPD$CLMP$H;
145   3                END;
146   2         IF SPD$STP > SPD$REF$CLMP$MAX$H
                   THEN  SPD$STP = SPD$REF$CLMP$MAX$H;
```

```
148   2    IF (NOT FRWD$FLG)
              THEN  SPD$STP = .00H;
150   2    END DET$SPD$SP;

           $EJECT
           /****************************************************************************************************
           *
           *  FUNCTION             SPEED REGULATOR CALCULATIONS
           *
           *  CALLING SEQUENCE  :  CALL SPD$REG$CALC
           *
           *  INPUTS      PLL$MODE              E$DATA.MODE$FLG        STOP$RATE        START$MODE   IVOLT$MAX   SPD$STP
           *              E$DATA.SRC$CEL$CNTR   ACCL$RATE              PLLC$LOAD        INVLIM
           *              ICOM$DEFAULT$H        ACCL$RATE$PROCESS      E$DATA.ICOM$CRS
           *
           *  OUTPUTS   : ICOM                  SPD$REG$FSTP
           *
           *  ABSTRACT  :      SPD$REG$CALC IS THE PROCEDURE CONTAINING THE SPEED REGULATOR.  REFER TO FIG.1 FOR A BLOCK
           *              DIAGRAM EQUIVALENT OF THE CONTENTS IN THIS PROCEDURE.  THE TWO MAIN INPUTS FOR THE SPD REG ARE:
           *
           *                 1) PLLC$LOAD - PRESET VALUE FOR THE PLL COUNTER WHICH IS USED TO DERIVE THE SPEED FEEDBACK
           *                 2) SPD$STP     REFERENCE COMMAND SPEED.
           *
           *                   TWENTY-FOUR SPEED (ACCLERATION/DECELERATION) RAMPS ARE INCLUDED.  12 RAMPS ARE DEDICATED TO
           *              12-PULSE OPERATION AND 12 RAMPS ARE DEDICATED TO 6-PULSE OPERATION.  THE 12 ARE DIVIDED INTO 6 PAIRS,
           *              ACCELERATION AND DECELARATION.  PAIR SELECTION IS CONTROLLED VIA E$DATA.SPD$RAMP, WHICH IS LOADED
           *              FROM THE SOURCE SIDE APPLICATION PROGRAM.  ACCEL/DECEL RATES ARE IN HARA.
           *                   AN EXCESSIVE SPD ERROR FUNCTION HAS BEEN ADDED.  THE AVERAGE SPD OF 2 SUCCESSIVE READINGS IS
           *              SUBTRACTED FROM THE SPD COMMANDED, SPD$STR$SUM AND COMPARED AGAINST THE HARA VARIABLE,
           *              SPEED$ERR$CLAMP.  IF THE LEVEL IS EXCEEDED, BIT 0 (01H) OF E$DATA.LOSS$SPD$CNT IS SET.
           *                   A STEP INPUT ENABLES THE SPD REG. TO BE STEPPED SO THE RESPONSE CAN BE STUDIED.  THE STEP
           *              COMMAND IS SPD$REG$STEP.
           *                   THE PROPORTIONAL-PLUS-INTEGRAL CONTROLLER HAS GAINS FOR 12 AND 6 PULSE OPERATION.
           *
           *              REFERENCES        SECTION 2 AND 8 OF DS38.OLC8
           ****************************************************************************************************/

151   1    SPD$REG$CALC: PROCEDURE;
152   2    SPD$RAMP = E$DATA.SPD$R/                                                  /* PLL INITIALIZATION MODE     */
153   2    IF INVLIN = 00H                                                          /* INVERSION LIMIT WORD CLEAR  */
             THEN DO;
155   3           CALL DET$SPD$SP;                                                   /* DETERMINE SPEED SET POINT   */
156   3           IF SPD$RAMP > 5H                                                   /* SPD$RAMP EXCEEDS LIMIT,     */
                     THEN SPD$RAMP = 0H;                                             /* DEFAULTS TO 0               */
158   3           IF (E$DATA.MODE$FLG AND 04H) = 0H                                  /* IF NOT SPEED ERROR FLAG     */
                    THEN DO;
160   4                  IF SPD$STP = SPD$STR
                           THEN ACCL$LMT = 0;
162   4                    ELSE DO CASE SPD$RAMP;
163   5                           DO;
164   6                            IF SPD$STP > SPD$STR
                                      THEN ACCL$LMT = ACCL$LMT + (ACCL$RATE$0$H);
166   6                               ELSE ACCL$LMT = ACCL$LMT + (DECEL$RATE$0$H);
167   6                           END;

168   5                           DO;
169   6                             IF SPD$STP > SPD$STR
                                      THEN ACCL$LMT = ACCL$LMT + (ACCL$RATE1$H);
171   6                               ELSE ACCL$LMT = ACCL$LMT + (DECEL$RATE1$H);
172   6                           END;

173   5                           DO
174   6                            IF SPD$STP > SPD$STR
                                     THEN ACCL$LMT = ACCL$LMT + (ACCL$RATE2$H);
176   6                              ELSE ACCL$LMT = ACCL$LMT + (DECEL$RATE2$H);
177   6                           END;
```

```
178  5              DO;
179  6              IF SPD$STP > SPD$STR
                       THEN ACCL$LMT = ACCL$LMT + (ACCL$RATE3$H);
181  6                 ELSE ACCL$LMT = ACCL$LMT + (DECEL$RATE3$H);
182  6              END;
183  5              DO;
184  6              IF SPD$STP > SPD$STR
                       THEN ACCL$LMT = ACCL$LMT + (ACCL$RATE4$H);
186  6                 ELSE ACCL$LMT = ACCL$LMT + (DECEL$RATE4$H);
187  6              END;
188  5              DO;
189  6              IF SPD$STP > SPD$STR
                       THEN ACCL$LMT = ACCL$LMT + (ACCL$RATE5$H);
191  6                 ELSE ACCL$LMT = ACCL$LMT + (DECEL$RATE5$H);
192  6              END;
193  5              END;                                    /* END SPD$RAMP DO CASE      */
194  4        IF ACCL$LMT > 7FFFH                           /* IS IT TIME TO CHANGE      */
                 THEN DO;                                   /* THE RATE LIMITED SPEED    */
196  5              IF SPD$STP > SPD$STR                    /* SET POINT                 */
                       THEN DO;
198  6                    SPD$STR = SPD$STR + 01;           /* ACCELERATE                */
199  6                    ACCL$LMT = 0;
200  6                    END;
201  5              ELSE IF SPD$STP < SPD$STR
                       THEN DO;
203  6                    SPD$STR = SPD$STR - 01;           /* DECELERATE                */
204  6                    ACCL$LMT = 0;
205  6                    END;
207  4              END;
                 END;
208  3     ELSE DO;                                         /* SPEED ERROR FLAG SET SO   */
209  4        SPD$STR = SPD$STR - STOP$RATE$H;              /* DECREMENT SPEED VIA STOP$RATE */
210  4        IF SPD$STR < 0
                 THEN SPD$STR = 0;
212  4        END;
213  3  CALL DOUBLE$PRECISION$DIVIDE(@SPD$FDBK$CONST,PLLC$SCALE,@SPD);  /* CALCULATED MOTOR SPEED VIA */
                                                        /* PLLC SCALE                */
214  3  IF SPD$REG$FSTP = TRUE                          /* SPEED REG FIRST PASS      */
           THEN DO;
216  4        CALL MUX$SET(SPD$STORE,SPD$CHAN);         /* SET UP A/D READ           */
217  4        SPD$REG$FSTP = FALSE;                     /* RESETS FIRST PASS FLAG    */
218  4        SPD$SUM = SPD;                            /* INITIALIZES SPD$SUM       */
219  4        PREVIOUS$SPEED = SPD;
220  4        O$SPD$ERR = 0H;                           /* INITIALIZE OLD SPD ERROR  */
221  4        SPD$RESID = 0H;                           /* INITIALIZE SPD RESIDUE    */
222  4        IF DSYNC                                  /* PRECONDITION THE SPEED REG */
                 THEN DO;                               /* INTEGRATOR                */
224  5              TMP$ICOM = ICOM;
225  5              DSYNC = FALSE;
226  5              END;
227  4           ELSE TMP$ICOM = ICOM$START$H;
228  4        ANA$SPD = MUX$READ(SPD$STORE);            /* READ SPEED TO PRECONDITION */
229  4        SPD$STR = SAR(ANA$SPD + SAR(ANA$SPD,2),2);  /* REGULATOR               */
230  4        END;
231  3  SPD$STR$SUM = SPD$STR + E$DATA.SPD$REG$STEP;    /* SPEED REGULATOR STEP INPUT */
232  3  IF (SYNC$ENABLE AND 03H) = 03H
           THEN SPD$STR$SUM = SPD$STR$SUM + SYNC$SPD$ADJ;
234  3  IF SYNC$REG$ENABLE                              /* IF TRYING TO SYNCHRONIZE TO */
           THEN DO;                                     /* THE LINE FREQUENCY THEN USE */
236  4        LEAD$LAG = LEAD$LAG$ADJ$ALT$H;            /* ALTERNATE SPEED REGULATOR */
237  4        SPD$G1 = SPD$G1$ALT$H;                    /* GAINS (HIGHER)            */
238  4        SPD$G2 = SPD$G2$ALT$H;
239  4        END;
```

```
240  3          ELSE DO;
241  4             LEAD$LAG = LEAD$LAG$ADJUST$H;                         /* ELSE JUST USE THE NORMAL SPD */
242  4             SPD$G1 = SPD$G1$H;                                    /* GAINS,                       */
243  4             SPD$G2 = SPD$G2$H;
244  4          END;

$EJECT
/*******************************************************************************
*                                                                             *
*                     ADJUSTABLE FEEDBACK LEAD-LAG                            *
*                                                                             *
*  THE LEAD/LAG FILTER IS OF THE FOLLOWING FORM:  (1 + 2*T*S)                 *
*                                                 -----------                 *
*                                                  (1 + T*S)                  *
*                                                                             *
*  WHERE THE TIME CONSTANT, T, CAN BE ADJUSTED VIA THE HARA VARAIBLE          *
*  LEAD$LAG$ADJUST$H                                                          *
*                                                                             *
*             LEAD$LAG$ADJUST$H            T (SECONDS)                        *
*             -----------------            -----------                        *
*                     0               FILTER IS BYPASSED                      *
*                     1                     .0125                             *
*                     2                     .0292                             *
*                     3                     .0625                             *
*                     4                     .1292                             *
*                     5                     .2529                             *
*                     6                     .530                              *
*                     7                    1.064                              *
*                     8                    2.13                               *
*******************************************************************************/

245  3       IF SPD$RESIDUE(LOW(LEAD$LAG))
                THEN DO;
247  4             LD$SPD = SPD + (DL$SPD:=SPD - SPD$SUM);
248  4             SPD$R = UNSIGN(DL$SPD:=DL$SPD + INT(SPD$R)) AND SPD$RESIDUE(LOW(LEAD$LAG));
249  4             SPD$SUM = SPD$SUM + SAR(DL$SPD,LOW(LEAD$LAG))
250  4          END;
251  3          ELSE LD$SPD = SPD;

/*******************************************
*                                         *
*   DETECTION OF LOSS OF SPEED CONTROL    *
*                                         *
*******************************************/

252  3       NEW$SPEED = SPD;
253  3       IF (IABS(SPD$STR$SUM - (SAR((TOTALSPEED:= NEW$SPEED + PREVIOUS$SPEED),1)))
                > SPD$REG$ERR$TOL$H
                THEN LOSS$SPD$CNT = LOSS$SPD$CNT OR 01H;
255  3          ELSE LOSS$SPD$CNT = LOSS$SPD$CNT AND 0FEH;
256  3       PREVIOUS$SPEED = NEW$SPEED;

$EJECT

/*******************************************
*                                         *
*     CALCULATE AND CLAMP SPEED ERROR     *
*                                         *
*     IF DEC$FLG IS SET, SPD$ERR=0        *
*                                         *
*     REFER TO FIG. 1 (22H) AND           *
*   SECTION B.2.3, EQ.23 OF DS3820LCB     *
*                                         *
*******************************************/
```

```
IF (E$DATA$MODE$FLG AND 08H) = 0                              /* IS DEC$FLG ZERO  */
   THEN SPD$ERR = SPD$STR$SUM - LD$SPD;
   ELSE SPD$ERR = 0;
IF SPD$ERR > SPD$ERR$LMT$H
   THEN SPD$ERR = SPD$ERR$LMT$H;
ELSE IF SPD$ERR < -SPD$ERR$LMT$
   THEN SPD$ERR = -SPD$ERR$LMT$H

$EJECT
/*********************************************************
*                                                        *
*      ADJUSTABLE DOUBLE BRAKE FILTER                    *
*                                                        *
*   SPD$ERR$FILTER$H        BRAKE FREQUENCIES            *
*   ---------------------------------------------------  *
*       01H                FILTER IS BYPASSED            *
*       02H                 17 AND 49 RAD.               *
*       04H                DBL BRAKE AT 17 RAD           *
*                                                        *
*********************************************************/

IF NOT(SPD$ERR$FILTER$H)
  THEN DO;
        IF SHR(SPD$ERR$FILTER$H,1)
          THEN DO;
                ADJ$1 = 1;
                ADJ$2 = 2;
               END;
        ELSE IF SHR(SPD$ERR$FILTER$H,2
          THEN DO;
                ADJ$1 = 1;
                ADJ$2 = 1;
               END;
        SPD$ERR$R1 = UNSIGN(SPD$ERR$INT1:=SPD$ERR-SPD$ERR$1+INT(SPD$ERR$R1)) AND SPD$ERR$TAB(ADJ$1);
        SPD$ERR$1 = SPD$ERR$1+SAR(SPD$ERR$INT1,(IND:=4-ADJ$1));
        SPD$ERR$R2 = UNSIGN(SPD$ERR$INT2:=SPD$ERR$1-SPD$ERR$2+INT(SPD$ERR$R2)) AND SPD$ERR$TAB(ADJ$2);
        SPD$ERR$2 = SPD$ERR$2+SAR(SPD$ERR$INT2,(IND:=4-ADJ$2));
       END;
  ELSE SPD$ERR$2=SPD$ERR;

/*********************************************************
*                                                        *
*  PROPORTIONAL PLUS INTEGRAL CONTROLLER                 *
*                                                        *
*       REFER TO FIG.1 (22J-22N) AND                     *
*       SECTION 9.2.4 OF DW3020LCB                       *
*                                                        *
*********************************************************/

INT$TRM = SPD$G2 * SPD$ERR$2 + SPD$RESID;
PROP$TRM = SPD$G1 * (SPD$ERR$2 - O$SPD$ERR);
O$SPD$ERR = SPD$ERR$2;
SPD$RESID = INT(SHL((UNSIGN(PROP$TRM) AND 0007H),5)
            + (UNSIGN(INT$TRM) AND 00FFH));                   /* SCALE AND RETAIN RESIDUAL */
```

```
PL/M-86 COMPILER    LSPD - SPEED REGULATOR, LOAD SIDE MIMD

              $EJECT
              /*******************************************************************
              *              TMP1 IS THE TORQUE CLMP BASED ON SPEED              *
              *                                                                  *
              *                      TORQ$VS$SPD$GAIN$H                          *
              *         TMP1 = ------------------------------- * SPD             *
              *                             16                                   *
              *                                                                  *
              *    IF TORQ$VS$SPD$GAIN$H = OFFH THEN TMP1 CALC. IS DISABLED AND  *
              *   TORQ$VS$SPD$GAIN$H IS CLAMPED TO 020H DURING SEG$FIRE OPERATION*
              *                 TMP1 = ICOM$SEG$CLMP$H                           *
              *******************************************************************/
 286   3            IF TORQ$VS$SPD$GAIN$H <> OFFH
                    THEN DO;
 288   4                  IF TORQ$VS$SPD$GAIN$H > 20H
                             THEN  TORQ$VS$SPD$GAIN$H = 20H;
 290   4                  TMP1 = SAR((TORQ$VS$SPD$GAIN$H * SPD),4);
 291   4                END;
 292   3            ELSE TMP1 = ICOM$HI$CLMP$H;
 293   3          IF TMP1 > ICOM$HI$CLMP$H
                    THEN TMP1 = ICOM$HI$CLMP$H;
 295   3          ELSE IF TMP1 < ICOM$LO$CLMP$H
                    THEN TMP1 = ICOM$LO$CLMP$H;

                  TMP$ICOM = TMP$ICOM + SAR((PROP$TRM + SAR(INT$TRM,5)),3);     /* CALCULATE THE CURRENT COMMAND FROM  */
 298   3          IF TMP$ICOM > TMP1                                            /* PROPORTIONAL AND INTEGRAL TERM AND  */
                    THEN  TMP$ICOM = TMP1;                                      /* CLAMP                               */
   0   3          ELSE IF TMP$ICOM < -TMP1
                    THEN TMP$ICOM = -TMP1;

                  ICOM = TMP$ICOM;

 303   3          END;
 304   2     END SPD$REG$CALC;
L/M-86 COMPILER    LSPD - SPEED REGULATOR, LOAD SIDE MIM

              $EJECT
              /*********************************************************************************************************
              *
              *  FUNCTION           : SPEED REGULATOR
              *  CALLING SEQUENCE   : INTERRUPT ACTIVATED (46)
              *
              *  INPUTS   : ICOM$DEFAULT$H     START$MODE              INPUT(05H)
              *  OUTPUTS  : ICOM               E$DATA.SPD$PASS$FLAG    E$DATA$SPD    SPD$STP    EDATA$ICOM    OUTPUT(27H)
              *
              *  ABSTRACT      : THE SPEED REGULATOR IS OPENED BY SETTING  EDATA.OPEN$SPD$REG = 01H
              *  REFERENCES    : SECTION 2 OF DS3820LCB
              *
              *********************************************************************************************************/
 305   1     SPD$REG: PROCEDURE INTERRUPT 46 PUBLIC;

 306   2           ENABLE;
 307   2           OUTPUT(HMPG$8259$CMND1) = EOI$MSTR;                             /* END OF INTERRUPT TO MASTER    */
 308   2           OUTPUT(SCOPE$FLAG) = (SCOPE$FLAGS:=SCOPE$FLAGS OR 040H);        /* SET EXEC FLAG  HITA TP 6      */

 309   2           LOSS$SPD$CNT = E$DATA.LOSS$SPD$CNT;                             /* GET VARIABLES FROM COMMON     */
 310   2           SYNC = EDATB.SYNC;                                              /* MEMORY                        */
 311   2           SYNCED = EDATB.SYNCED;
 312   2           BYPCC = EDATB.BYPCC;
 313   2           SYNC$SPD$ADJ = EDATB.SYNC$SPD$ADJ;
```

```
314   2        IF SYNC                                                           /* SYNCHRONIZING              */
                  THEN DO;                                                       /* -------------              */
316   3                 SYNC$ENABLE = LOW(SYNC$CONTROL$H);                       /* PICK UP SYNC CONTROL WORD  */
317   3                 CALL SPD$REG$CALC;                                       /* RUN THE SPEED REGULATOR    */
318   3                 IF (SPD$STP = SYNC$SPD$STP$H) AND (SPD$ERR2 < SYNC$SPD$ERR$TOL$H) /* WHEN GET UP TO 60HZ */
                          THEN SYNC$REG$ENABLE = TRUE;                           /* THEN ENABLE THE OTHER      */
320   3              END;                                                        /* SYNC REGULATORS            */
321   2        ELSE IF NOT(SYNC) AND SYNCED AND BYPCC                            /* DE-SYNCHRONIZING           */
                  THEN DO;                                                       /* ----------------           */
323   3                 SYNC$REG$ENABLE = FALSE;
324   3                 IF DSYNC$FSTP = TRUE                                     /* SET UP CURRENT RAMP ON     */
                          THEN DO;                                               /* FIRST PASS                 */
326   4                           ICOM$SCL = SAL(ICOM, 4);
327   4                           DSYNC$FSTP = FALSE;
328   4                           DSYNC = TRUE;
329   4                        END;
330   3                 I$MOTOR$SCL = SAL((I$MOTOR := EDATB.I$MOTOR),4);
331   3                 DELTA$ICOM$DSYNC = I$MOTOR$SCL - ICOM$SCL;               /* PICK UP THE MOTOR CURRENT  */
332   3                 IF DELTA$ICOM$DSYNC > DSYNC$IRATE$LIM$H                  /* RAMP ICOM UNTIL CURRENT    */
                          THEN ICOM$SCL = ICOM$SCL + DSYNC$IRATE$LIM$H;          /* COMMAND AND MOTOR          */
334   3                 ELSE IF DELTA$ICOM$DSYNC < DSYNC$IRATE$LIM$H             /* CURRENT ARE EQUAL          */
                          THEN ICOM$SCL = ICOM$SCL - DSYNC$IRATE$LIM$H;
336   3                   ELSE ICOM$SCL = I$MOTOR$SCL;
337   3                 IF ICOM$SCL > 4000H                                      /* CLAMP TO 1PU CURRENT       */
                          THEN ICOM$SCL = 4000H;
339   3                   ELSE IF ICOM$SCL = -4000H
                                 THEN ICOM$SCL = -4000H;
342   3                 ICOM = SAR(ICOM$SCL, 4);                                 /* SCALE CURRENT COMMAND      */
                     END;
```

PL/M-86 COMPILER    LSPD - SPEED REGULATOR, LOAD SIDE, MIMD

```
         $EJECT
343   2        ELSE DO;                                                          /* NORMAL SPEED REGULATOR     */
344   3                 SYNC$ENABLE = 00H;                                       /* ----------------------     */
345   3                 SYNC$REG$ENABLE = FALSE;
346   3                 IF (E$DATA.OPEN$SPD$REG = 00H) OR (EDATA.OPEN$SPD$REG = 0FH) /* SPEED REGULATOR IS CLOSED */
                          THEN CALL SPD$REG$CALC;                                /* MAKE SPD REG CALC          */
348   3                   ELSE DO;                                               /* SPEED REGULATOR IS OPEN    */
349   4                          IF ICOM$DEFAULT$H > ICOM$HI$CLMP$H              /* SET CURRENT COMMAND TO     */
                                   THEN ICOM = ICOM$HI$CLMP$H;                   /* LOWER OF TWO HARA          */
351   4                            ELSE ICOM = ICOM$DEFAULT$H;                   /* VARIABLES                  */
352   4                        END;
353   3              END;
354   2        E$DATA.SPD = SPD;                                                 /* INSERT VARIABLES INTO COMMON */
355   2        E$DATA.ICOM = ICOM;                                               /* MEMORY                     */
356   2        E$DATA.SPD$PASS$FLG = SPD$PASS$FLG;
357   2        E$DATA.LOSS$SPD$CNT = LOSS$SPD$CNT;
358   2        EDATB.SYNC$REG$ENABLE = SYNC$REG$ENABLE;
359   2        SPD$MODE$LD = MODE$TRACKER$LD;                                    /* DIAGNOSTIC LIST            */
360   2        MODE$TRACKER$LD = 40H;
361   2        IF (LIST$SITE$LD$H AND MODE$TRACKER$LD) <> 0H
                  THEN DO;
363   3                 CALL DIAG$LIST;
364   3              END;
365   2        MODE$TRACKER$LD = SPD$MODE$LD;
366   2        DISABLE;
367   2        SPD$REG$ON = TRUE;                                                /* SIGNAL SPD REG DONE        */
368   2        OUTPUT(SCOPE$FLAG) = (SCOPE$FLAGS:=SCOPE$FLAGS AND 0BFH);         /* RESET EXEC FLAG HITA TP 6  */
369   2        OUTPUT(HITA$8259$CMND1) = EOI$SPD$REG;                            /* END OF INTERRUPT TO SLAVE  */
370   2     END SPD$REG;
371   1     END LSPD;
```

What is claimed is:

1. In a motor control system of the type in which an AC motor is selectively furnished with electrical power (voltage and current) directly from supply mains and from a power conditioner connected between the supply mains and the motor, said power conditioner including a source converter and a load converter each including controllable switches and each response to a respective phase-locked loop acting through motor speed and motor torque control loops to control the conductive states of the converter switches and thereby the operation state of the motor, a method of transfering the motor between being supplied with power from said supply mains being supplied with power from said power conditioner comparing the steps:

(a) coupling the power conditioner to the supply mains and to the motor without rendering conductive the switches of said power converter;

(b) allowing each of said phase-locked loops to reach a stable state of operation;

(c) disabling the speed control loop;

(d) determining the motor current and providing a current feedback signal representative thereof;

(e) applying said current feedback signal to the torque control loop to develop a torque command;

(f) controlling the source converter in response to the torque command, to achieve the same value current as the motor current;

(g) controlling the load side converter in response to the torque command to control the angle of rendering its controllable switches conductive;

(h) comparing the current supplied to the motor by the power conditioner to the current of the motor;

(i) disconnecting the supply mains from the motor when the current supplied by the power conditioner and the current in the motor are approximately equal; and (j) activating the power conditioner speed control loop at the same time the supply mains are disconnected with the speed regulator output initialized to the value of current presently being supplied.

2. The invention in accordance with claim 1 in which the phase-locked loop further acts through a flux regulator loop and in which said flux regulator loop is disabled at the time the speed control loop is disabled and enabled at the time the speed control loop is enabled to thereby cause a setpoint of said flux regulator loop to be changed to a value required by said torque command.

3. The invention in accordance with claim 1 wherein said power conditioner includes two paths each including a source and a load converter and wherein the current supplied to the motor by the conditioner comprising the sum of the currents in both of said paths.

* * * * *